United States Patent
Yomo et al.

(10) Patent No.: US 7,577,124 B2
(45) Date of Patent: Aug. 18, 2009

(54) RELAY APPARATUS, TERMINAL APPARATUS AND RELAY METHOD

(75) Inventors: Hidekuni Yomo, Kamakura (JP); Yoshinori Kunieda, Ota-ku (JP); Yuuri Yamamoto, Nakano-ku (JP); Yoshihito Kawai, Hodogaya-ku (JP)

(73) Assignee: Panasonic Corporation, Osaka (JP)

( * ) Notice: Subject to any disclaimer, the term of this patent is extended or adjusted under 35 U.S.C. 154(b) by 990 days.

(21) Appl. No.: 10/942,122

(22) Filed: Sep. 16, 2004

(65) Prior Publication Data

US 2005/0058104 A1  Mar. 17, 2005

(30) Foreign Application Priority Data

Sep. 16, 2003 (JP) .............................. 2003-323674
Aug. 4, 2004 (JP) .............................. 2004-228562

(51) Int. Cl.
   *H04Q 7/24* (2006.01)
   *H04L 12/413* (2006.01)

(52) U.S. Cl. ....................... 370/338; 370/445

(58) Field of Classification Search .................. 370/338, 370/445
   See application file for complete search history.

(56) References Cited

U.S. PATENT DOCUMENTS

2002/0167903 A1* 11/2002 Nakano et al. ............... 370/230
2004/0258064 A1* 12/2004 Nakamura et al. ........... 370/389
2005/0013253 A1* 1/2005 Lindskog et al. ............ 370/238
2005/0222948 A1* 10/2005 Sato et al. ..................... 705/40

FOREIGN PATENT DOCUMENTS

| JP | 59010043 | 1/1984 |
| JP | 62077725 | 4/1987 |
| JP | 2002152065 | 5/2002 |

OTHER PUBLICATIONS

"Mastering Switches," Tokyo: ASCII, Inc. 2003, pp. 81-82.
"Medium Access Control Enhancements for Quality of Service," IEEE standards draft, IEEE P802.11e/D8.0, Feb. 2004, pp. 142-146.

* cited by examiner

*Primary Examiner*—Andrew Lee
(74) *Attorney, Agent, or Firm*—Dickinson Wright, PLLC

(57) ABSTRACT

A relay apparatus, terminal apparatus and relay method for relaying signals with a reduced scale of the apparatus, without temporally switching between transmission and reception and with reduced waste of time when relay is performed at the same frequency on a radio communication network on which bidirectional communication is performed. A radio reception section 202 outputs information signals to a switch 208, outputs relay control signals to a demodulation section 204 after subjecting predetermined radio reception processing. The demodulation section 204 demodulates a relay control signal. A relay control signal processing section 206 decides the possibility of relay of information signals and inquires, when the relay is possible, whether the terminal apparatus on the receiving side can receive this information signal or not. Furthermore, the relay control signal processing section 206 connects a switch 208 during the stored relay time. The switch 208 is connected only the information signals to be relayed are received under the control of a relay control section 2063.

13 Claims, 28 Drawing Sheets

| DESTINATION ADDRESS 801 | TRANSMISSION SOURCE ADDRESS 803 | START TIME 805 | CONTINUATION TIME 807 | RELAY DECISION 809 | RECEPTION DECISION BY DESTINATION TERMINAL 811 |
|---|---|---|---|---|---|
| TERMINAL B ADDRESS | TERMINAL A ADDRESS | Td1 | Ta1 | OK | OK |
| TERMINAL C ADDRESS | TERMINAL D ADDRESS | Td2 | Ta2 | OK | |
| ... | ... | ... | ... | ... | ... |

FIG.8

RELAY APPARATUS, TERMINAL APPARATUS AND RELAY METHOD

BACKGROUND OF THE INVENTION

1. Field of the Invention

The present invention relates to a relay apparatus, terminal apparatus and relay method, and more particularly, to a relay apparatus, terminal apparatus, and relay method which relays signals at the same frequency on a radio communication network on which bidirectional communications between apparatuses are carried out.

2. Description of the Related Art

Conventionally, this type of relay apparatus is disclosed in the Unexamined Japanese Patent Publication No.SHO 59-10043, for example. The Unexamined Japanese Patent Publication No.SHO 59-10043 discloses a method of relaying a signal with a same frequency for transmission and reception and improving a spectrum utilization efficiency by storing the received signal as a digital signal, reproducing and transmitting the stored signal. In this method, only one radio frequency band is used, however, since the received signal is transmitted after being stored, it is necessary to carry out transmission and reception at different times, which produces waste of time.

In contrast, for example, the Unexamined Japanese Patent Publication No.SHO 62-77725 discloses a configuration capable of reducing waste of time by removing interference produced by a signal transmitted from a transmission antenna of a relay apparatus returning to a reception antenna using an equalization circuit and immediately transmitting the received signal.

However, such a relay apparatus which removes interference using this equalization circuit is required to suppress an amount of coupling between the transmission antenna and reception antenna to a sufficiently small level. That is, the transmission antenna and reception antenna need to be disposed by keeping a sufficient distance from each other, which increases the size of the apparatus.

Furthermore, when a terminal apparatus requiring relay by the relay apparatus moves and it is impossible to suppress an amount of coupling between the transmission/reception antennas, it is difficult to remove interference of an echo wave and transmission quality degrades drastically. Furthermore, a possibility that the relay apparatus may oscillate is also increased.

In addition, for example, "Kanzen Zukaishiki network Sainyuumon" (Tokyo: ASCII, Inc. 2003, PP. 80-83) discloses a technology on a mechanism which enables a desired communication even if collision occurs during relay in a wired communication. Furthermore, "Draft Amendment to IEEE Std 802.11, 1999 Edition (Reaff 2003)" (IEEE 2004, PP. 142-146) proposes a scheme of terminals located at a directly communicable distance directly communicating with each other without any access point in an infrastructure mode according to a wireless LAN standard specification (IEEE802.11).

On the other hand, a broadcasting technology such as terrestrial digital television, as shown in the Unexamined Japanese Patent Publication No.2002-152065, for example, disposes a echo canceller in a relay apparatus when broadcasting and relaying an OFDM (Orthogonal Frequency Division Multiplex) signal so as to realize relay with less degradation of signal quality even when it is not possible to sufficiently reduce an amount of coupling between transmission/reception antennas of the relay apparatus.

However, the aforementioned broadcasting technology assumes as preconditions that the broadcasting station which transmits a signal is immobile, the reception direction at the relay apparatus is constant, the radio transmission path is also relatively stable and signals are continuously being transmitted as broadcast waves.

On the contrary, when relay is performed at the same frequency on a radio communication network on which bidirectional communication is carried out, a terminal apparatus transmitting a signal generally moves, the reception direction at the relay apparatus and the situation of the radio transmission path changes, resulting in a non-continuous communication with times during which one terminal apparatus is transmitting a signal and times during which the terminal apparatus is not transmitting any signal. Therefore, simply introducing an echo canceller according to the aforementioned broadcasting technology results in a problem that it is not possible to realize relay with waste of time reduced using a small relay apparatus.

SUMMARY OF THE INVENTION

It is an object of the present invention to provide a relay apparatus, terminal apparatus and relay method capable of realizing relay with reduced size of the apparatus and reduced waste of time without temporally switching between transmission and reception on a radio communication network on which bidirectional communication is performed.

A main theme of the present invention is to reserve a path to transmit an information signal and relay the information signal through the reserved path when a relay apparatus relays an information signal from a terminal apparatus to another terminal apparatus at a same radio frequency, by the terminal apparatus transmitting a relay control signal prior to transmission of the information signal.

The relay apparatus according to an aspect of the invention is a relay apparatus that relays an information signal transmitted by radio at the same frequency, comprising a reception section that receives a relay control signal to notify a relay time for relaying the information signal prior to the information signal and a relay section that relays the information signal during a relay time notified by the relay control signal.

The terminal apparatus according to another aspect of the invention is a terminal apparatus used in a radio communication system in which an information signal transmitted by radio by the relay apparatus at the same frequency, comprising a generation section that generates a relay control signal including information on the relay time for relaying the information signal and a transmission section that transmits the relay control signal prior to the information signal, wherein the transmission section transmits the information signal during the relay time.

The relay method according to a further aspect of the invention is a relay method for the relay apparatus relaying an information signal transmitted from the terminal apparatus, comprising of a step of the terminal apparatus transmitting a first relay control signal to reserve the path for transmitting the information signal, a step of the relay apparatus receiving the first relay control signal, a step of deciding whether it is possible or not to perform the relay operation of the information signal within a relay time notified by the first relay control signal, a step of transmitting a second relay control signal indicating whether the relay operation is possible or not within the relay time, a step of the terminal apparatus receiving the second relay control signal, a step of transmitting the information signal during the relay time when the second relay control signal shows that the relay operation is possible and a step of the relay apparatus of relaying the information signal during the relay time.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 8 illustrates an example of a reservation table according to Embodiment 1;

DETAILED DESCRIPTION OF THE PREFERRED EMBODIMENTS

With reference now to the attached drawings, embodiments of the present invention will be explained in detail below.

Embodiment 1

Figure 1:
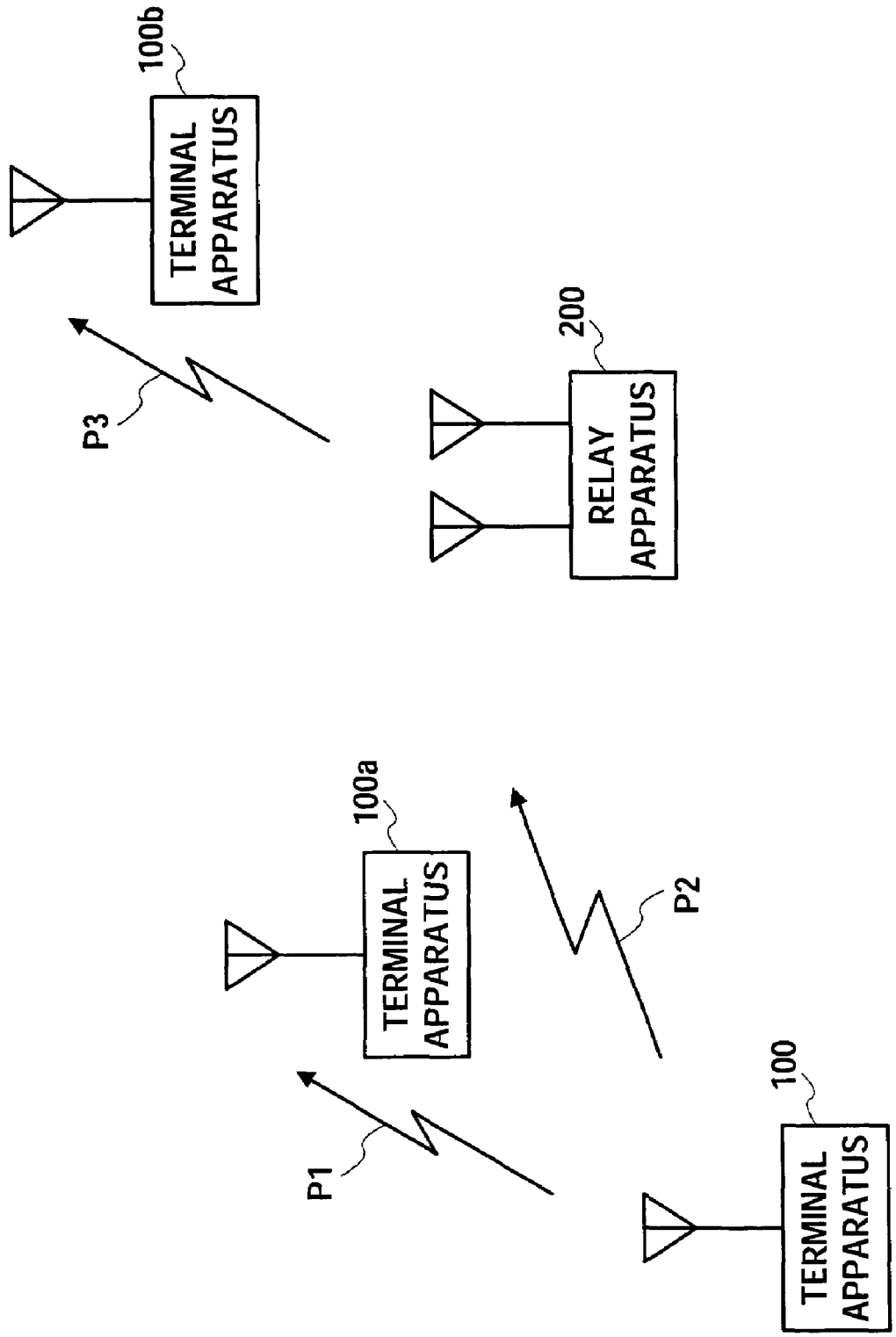
FIG. 1 is a an example illustrating a configuration of a radio communication network according to Embodiment 1 of the present invention.

FIG. 1 illustrates an example of a configuration of a radio communication network according to Embodiment 1 of the present invention. As shown in the same figure, the radio communication network according to this embodiment is constructed of terminal apparatuses 100, 100a, 100b and relay apparatus 200.

The terminal apparatuses 100, 100a, 100b are all movable and the terminal apparatus 100 is relatively close to the terminal apparatus 100a, and therefore the terminal apparatus 100 transmits a signal to the terminal apparatus 100a, using a transmission path P1.

On the other hand, the terminal apparatus 100 is far from the terminal apparatus 100b and therefore the terminal apparatus 100 sends a signal to the relay apparatus 200 using a transmission path P2 and further the relay apparatus 200 sends the signal from the terminal apparatus 100 to the terminal apparatus 100b using a transmission path P3.

FIG. 1 shows communications between the terminal apparatuses 100, 100a, 100b but a relay method which will be explained below can also be used for a communication between a terminal apparatus and an access point connected to a wired network, for example.

Figure 2:
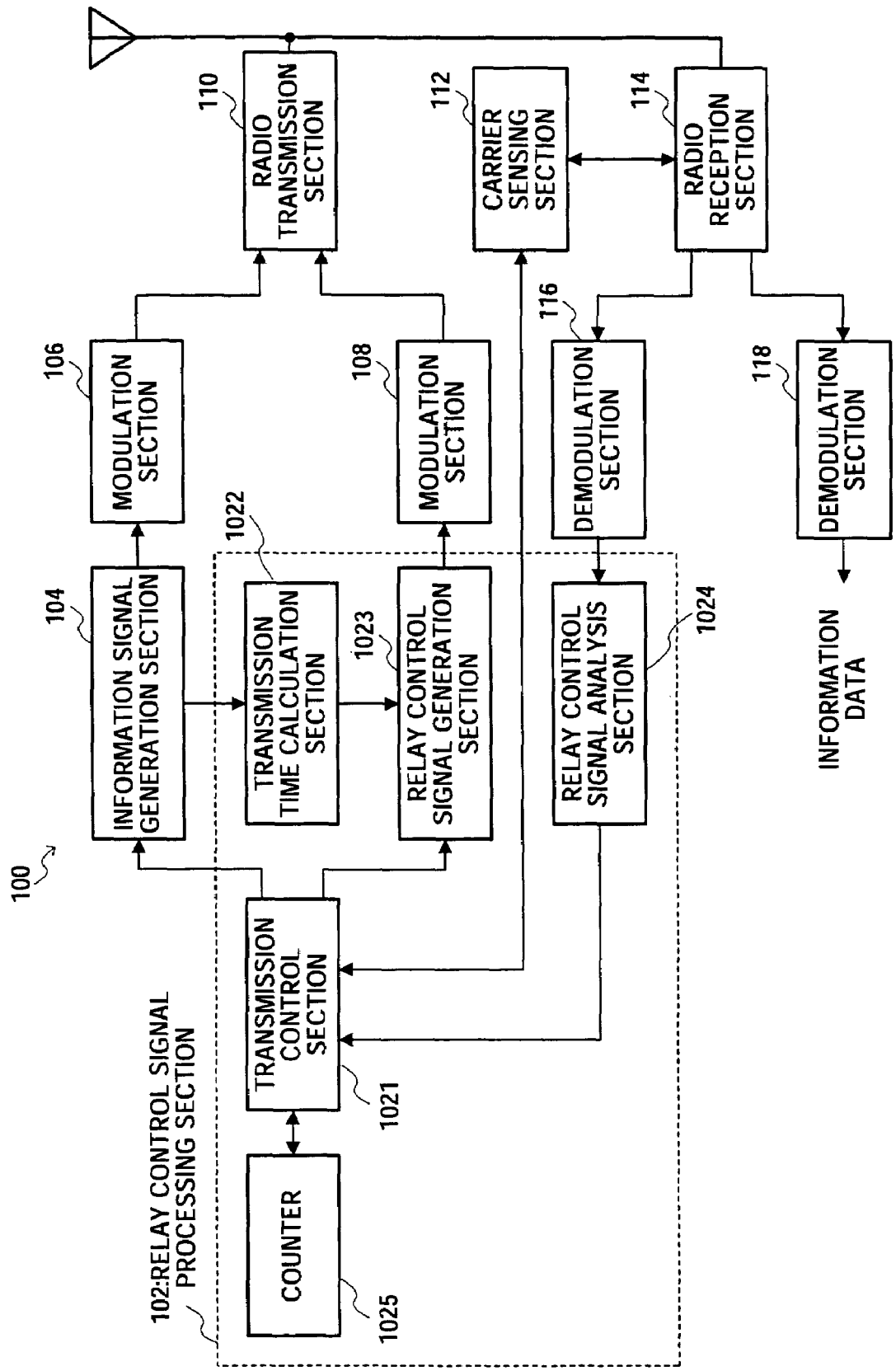
FIG. 2 is a block diagram showing a configuration of a terminal apparatus according to Embodiment 1.

FIG. 2 shows a block diagram showing a configuration of a terminal apparatus 100 according to Embodiment 1 of the present invention. The terminal apparatuses 100a, 100b also have similar configurations. The terminal apparatus 100 shown in FIG. 2 is provided with a relay control signal processing section 102, an information signal generation section 104, a modulation section 106, a modulation section 108, a radio transmission section 110, a carrier sensing section 112, a radio reception section 114, a demodulation section 116 and a demodulation section 118.

The relay control signal processing section 102 includes a transmission control section 1021, a transmission time calculation section 1022, a relay control signal generation section 1023, a relay control signal analysis section 1024 and a counter 1025. The relay control signal processing section 102 generates a relay control signal to reserve a path for transmitting an information signal such as speech and data, controls transmission timing of the relay control signal generated and also controls transmission timing of the information signal.

More specifically, when there is any information signal to be transmitted, the transmission control section 1021 controls the relay control signal generation section 1023 so as to send a relay possibility inquiry signal to inquire the possibility of relay of this information signal. Furthermore, when an OK signal indicating that the relay is possible is received as a relay control signal from the relay apparatus 200, the transmission control section 1021 controls the information signal generation section 104 so as to send the information signal at a count counted by the counter 1025. Furthermore, when an information signal reception possibility inquiry signal is received as a relay control signal from the relay apparatus 200, the transmission control section 1021 controls the relay control signal generation section 1023 so as to send an OK signal indicating that reception is possible or an NG signal indicating that reception is not possible as the relay control signal.

The transmission time calculation section 1022 calculates a transmission time from an amount of information of the information signal to be transmitted. That is, the transmission time calculation section 1022 calculates a transmission time by dividing the amount of information by a transmission rate, for example.

When there is an information signal to be transmitted, the relay control signal generation section 1023 generates a relay possibility inquiry signal including a required transmission time of this information signal. Furthermore, when a reception possibility inquiry signal about the information signal is received, the relay control signal generation section 1023 generates an OK signal or NG signal.

The relay control signal analysis section 1024 analyzes the received relay control signal and notifies the type of the relay control signal and necessary information to the transmission control section 1021. More specifically, the relay control signal analysis section 1024 classifies whether the received relay control signal is an OK signal indicating that the information signal is relayable, an NG signal indicating that the information signal is not relayable or reception possibility inquiry signal about the information signal and notifies the transmission control section 1021 that the respective signals have been received.

The counter 1025 starts operating simultaneously with the transmission of the relay possibility inquiry signal from the relay control signal generation section 1023 under the control of the transmission control section 1021 and the counter value should be set to certain value to be 0 at the timing at which the transmission of an information signal determined by the transmission control section 1021 starts.

Furthermore, the information signal generation section 104 generates an information signal such as speech and data and outputs the information signal to the modulation section 106 at the transmission timing indicated by the transmission control section 1021.

The modulation section 106 modulates the information signal and outputs the information signal to the radio transmission section 110.

The modulation section 108 modulates the relay control signal and outputs the modulated relay control signal to the radio transmission section 110.

The radio transmission section 110 carries out predetermined radio transmission processing (D/A conversion, up-conversion, etc.) on the information signal and relay control signal and sends the information signal to the relay apparatus 200 through an antenna.

To check whether any interfering signal is transmitted or not at the time of transmission of an information signal or relay control signal, the carrier sensing section 112 causes the radio reception section 114 to perform reception operation and performs carrier sensing. The carrier sensing section 112 notifies the transmission control section 1021 of the carrier sensing result.

The radio reception section 114 receives a signal through the antenna and carries out predetermined radio reception processing (down-conversion, A/D conversion, etc.).

The demodulation section 116 demodulates the received relay control signal and outputs the demodulated relay control signal to the relay control signal analysis section 1024.

The demodulation section 118 demodulates the received information signal and obtains the information data.

Figure 3:
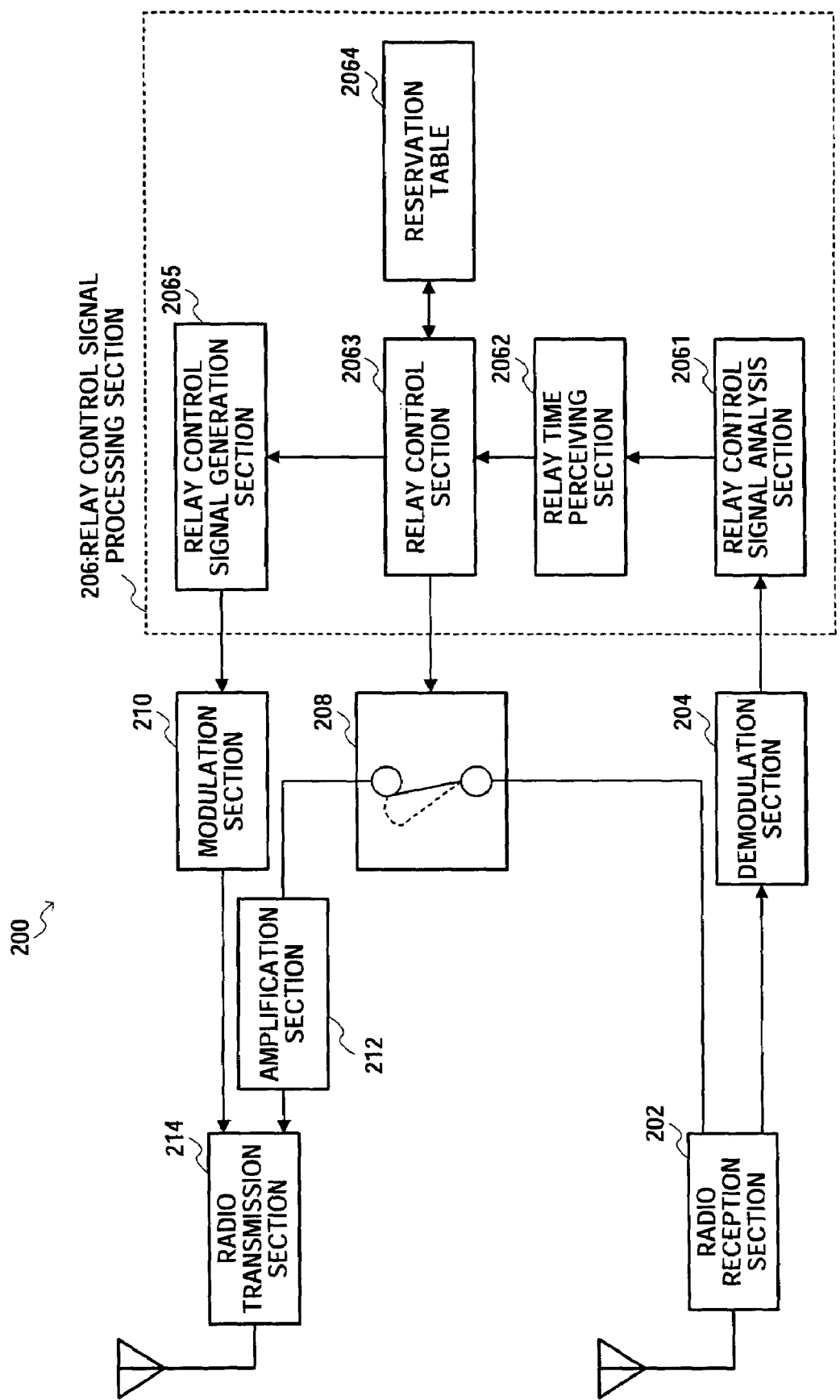
FIG. 3 is a block diagram showing a configuration of a relay apparatus according to Embodiment 1.

FIG.3 is a block diagram showing a configuration of a relay apparatus 200 according to Embodiment 1. The relay apparatus 200 shown in FIG. 3 is provided with a radio reception section 202, a demodulation section 204, a relay control signal processing section 206, a switch 208, a modulation section 210, an amplification section 212 and a radio transmission section 214.

The radio reception section 202 receives a signal through an antenna, outputs an information signal of the received signal to the switch 208, carries out radio reception processing (down-conversion, A/D conversion, etc.) on a relay control signal and outputs the relay control signal to the demodulation section 204.

The demodulation section 204 demodulates the received relay control signal and outputs the demodulated relay control signal to the relay control signal processing section 206.

The relay control signal processing section 206 is provided with a relay control signal analysis section 2061, a relay time perceiving section 2062, a relay control section 2063, a reservation table 2064 and a relay control signal generation section 2065. The relay control signal processing section 206 decides whether relay of the information signal is possible or not and when the relay is possible, inquires whether the terminal apparatus 100b on the receiving side can receive this information signal or not Furthermore, the relay control signal processing section 206 stores the time during which the information signal is relayed and connects the switch 208 during this relay time.

More specifically, the relay control signal analysis section 2061 analyzes the received relay control signal and decides the type of the relay control signal. That is, the relay control signal analysis section 2061 classifies the received relay control signal under any one of the categories; a relay possibility inquiry signal, an OK signal indicating that the reception by the terminal apparatus 100b on the receiving side is possible or an NG signal indicating that the reception is not possible.

When the received relay control signal is a relay possibility inquiry signal, the relay time perceiving section 2062 perceives the transmission start time and relay time indicating the continuation time of the information signal included in this signal.

The relay control section 2063 controls the relay control signal generation section 2065 so as to decide, when a relay possibility inquiry signal is received, whether relay is possible or not with reference to the reservation table 2064 and send a reception possibility inquiry signal for inquiring the terminal apparatus 100b on the receiving side about whether reception is possible or not as a relay control signal. On the other hand, when relay is not possible, the relay control section 2063 controls the relay control signal generation section 2065 so as to send an NG signal as the relay control signal. Furthermore, when an OK signal or NG signal is received from the terminal apparatus 100b on the receiving side, the relay control section 2063 controls the relay control signal generation section 2065 so as to send an OK signal or NG signal as a relay control signal to the terminal apparatus 100 on the transmitting side. Furthermore, the relay control section 2063 connects the switch 208 during a relay time of the information signal with reference to the reservation table 2064.

The reservation table 2064 stores the situation of reserving of the path for relaying the information signal according to the relay control signal transmitted from each terminal apparatus. More specifically, the reservation table 2064 stores the sender address, destination address of the information signal in association with the start time at which the relay of the information signal is started and continuation time during which relay continues.

When relay of the information signal is possible, the relay control signal generation section 2065 generates a reception possibility inquiry signal including the relay start time and continuation time of this information signal. Furthermore, when an OK signal or NG signal is received from the terminal apparatus 100b on the receiving side, the relay control signal generation section 2065 generates an OK signal or NG signal depending on the signal received from the terminal apparatus 100b.

Furthermore, the switch 208 is connected only when the information signal to be relayed is being received under the control of the relay control section 2063 and outputs the information signal received by the radio reception section 202 to the amplification section 212.

The modulation section 210 modulates the relay control signal and outputs the modulated signal to the radio transmission section 214.

The amplification section 212 amplifies the information signal and outputs the amplified information signal to the radio transmission section 214.

The radio transmission section 214 receives the amplified information signal and sends the amplified information signal through an antenna and carries out predetermined radio transmission processing (D/A conversion, up-conversion, etc.) on the relay control signal and sends the signal through the antenna.

Next, the transmission of a signal between the terminal apparatus 100 and terminal apparatus 100b through the relay apparatus 200 configured as shown above will be explained with reference to the sequence diagram shown in FIG. 4.

First, when the terminal apparatus 100 has information to be transmitted, the information signal generation section 104 generates an information signal. With regard to the information signal generated, the transmission time calculation section 1022 calculates a required transmission time Ta by dividing an amount of information by a transmission rate. This required transmission time Ta is equivalent to the continuation time during which the relay apparatus 200 continues the relay. Furthermore, the transmission control section 1021 determines a start time Td for starting transmission of an information signal after the transmission of the relay control signal (401). The start time Td is determined by a constant time or random time, etc.

When a desired relay time (that is, continuation time Ta and start time Td) is determined, a relay control signal (relay possibility inquiry signal) including information on the desired relay time is generated by the relay control signal generation section 1023 (403).

Figure 5:
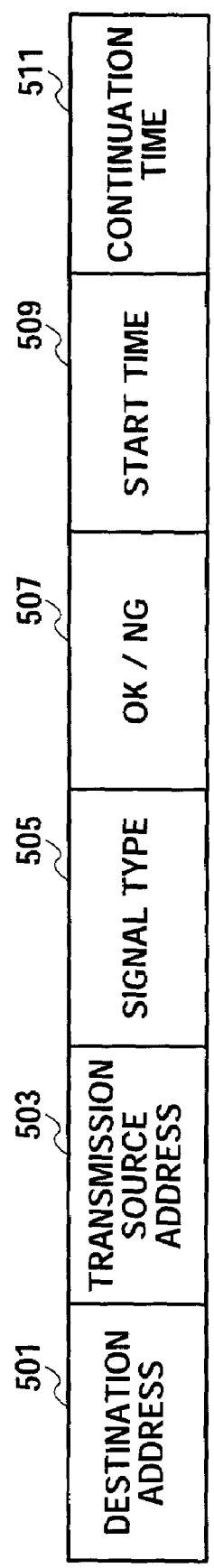
FIG. 5 is an example of a format of a relay control signal according to Embodiment 1.

Here, the data format of the relay control signal may be one shown in FIG. 5, for example. The relay control signal shown in FIG. 5 includes six fields of a destination address field 501 which stores the address of the terminal apparatus 100b which becomes the destination of the information signal, a sender address field 503 that stores the address of the terminal apparatus 100 which is the sender of the information signal, a signal type field 505 that stores distinction between the relay possibility inquiry signal, reception possibility inquiry signal and reception OK/NG signal and relay OK/NG signal, an OK/NG field 507 that stores either one of OK/NG signal when the signal type is a reception/relay OK/NG signal, a start time field 509 that stores the time at which relay is started when the signal type is a relay/reception possibility inquiry signal and a continuation time field 511 that stores the time for continuing relay when the signal type is a relay/reception possibility inquiry signal.

Here, the signal type field 505 indicates that the signal is a relay possibility inquiry signal, and therefore a relay control signal storing the start time Td and continuation time Ta is generated by the relay control signal generation section 1023.

When the relay control signal is generated, the transmission control section 1021 notifies the carrier sensing section 112 so as to perform carrier sensing. Then, the carrier sensing section 112 controls the reception operation of the radio reception section 114 and decides whether any interfering signal is being transmitted or not (405). The decision result is notified to the transmission control section 1021.

When the result of carrier sensing shows that no interfering signal is transmitted, the transmission control section 1021 sets the counter value of the counter 1025 to a start time Td, and at the same time the relay control signal is output from the relay control signal generation section 1023 to the modulation section 108, modulated by the modulation section 108, subjected to predetermined radio transmission processing (D/A conversion, up-conversion, etc.) by the radio transmission section 110 and sent to the relay apparatus 200 (407). The counter 1025 starts a countdown simultaneously with the transmission of the relay control signal (relay possibility inquiry signal).

Figure 6:
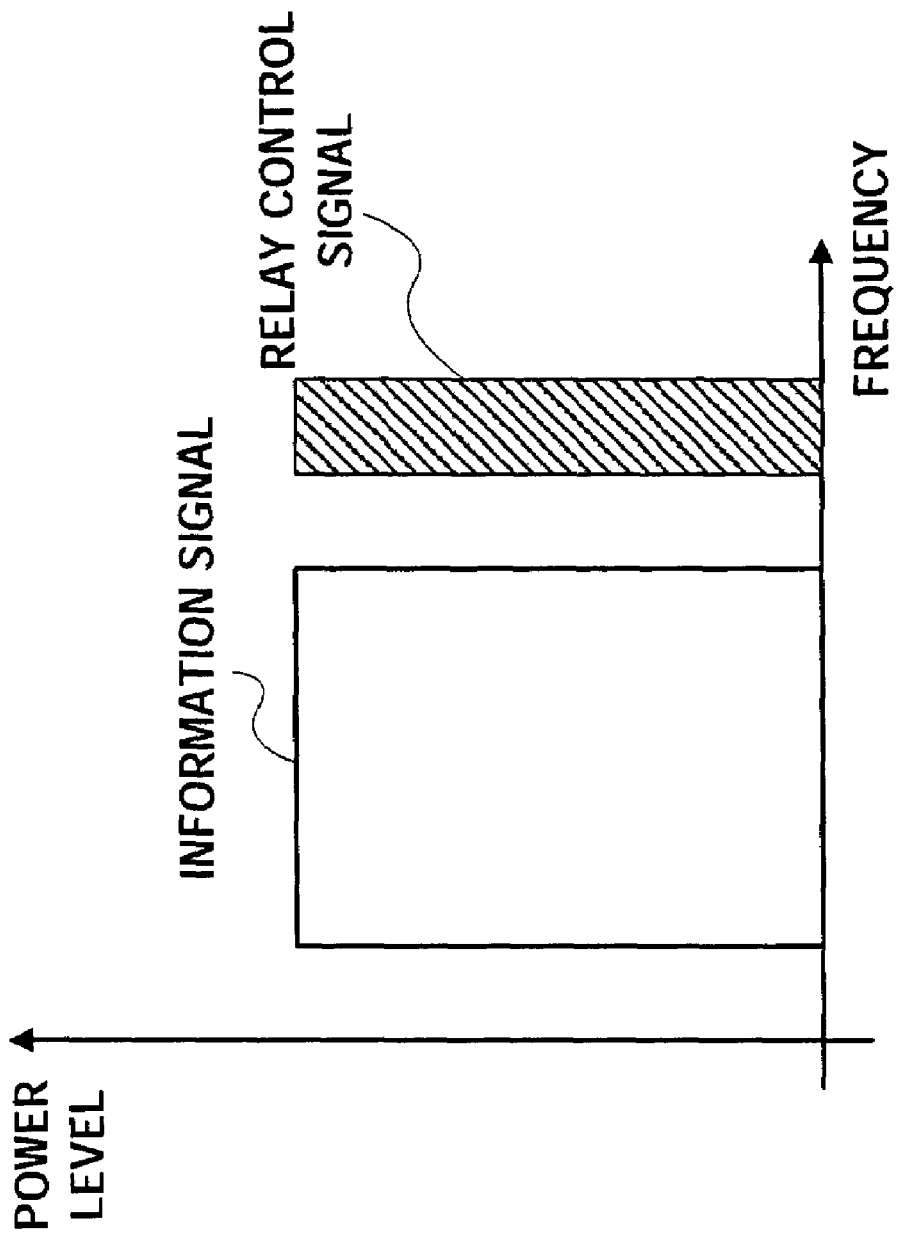
FIG. 6 illustrates an example of use of a frequency band according to Embodiment 1.

For example, as shown in FIG. 6, a wide frequency band is assigned to an information signal and a narrow frequency band is assigned to a relay control signal having a smaller amount of information than the information signal. By so doing, it is possible to improve the spectrum utilization efficiency.

The transmitted relay control signal (relay possibility inquiry signal) is received by the radio reception section 202 through the antenna of the relay apparatus 200, subjected to predetermined radio reception processing (down-conversion, A/D conversion, etc.), demodulated by the demodulation section 204 and output to the relay control signal analysis section 2061.

Then, the relay control signal analysis section 2061 decides from the signal type field 505 of the relay control signal that this relay control signal is a relay possibility inquiry signal. Since the relay control signal is a relay possibility inquiry signal, the relay time perceiving section 2062 perceives the relay start time Td and continuation time Ta (409) and notifies the perceived times to the relay control section 2063.

When the relay time is notified to the relay control section 2063, the relay control section 2063 references the reservation table 2064 and decides whether any signal is scheduled to be relayed from other terminal apparatuses during the notified relay time or not to thereby decide whether the signal from the terminal apparatus 100 can be relayed or not. Furthermore, the reservation table 2064 is updated and the issuance of a new relay request from the terminal apparatus 100 is recorded and the possibility of this relay is recorded (411).

When the relay is possible, the relay control section 2063 controls the relay control signal generation section 2065 and a relay control signal (reception possibility inquiry signal) for inquiring the possibility of reception of the terminal apparatus 100b is generated. That is, the relay control signal generation section 2065 generates a reception possibility inquiry signal which stores the fact that the signal is a reception possibility inquiry signal in the signal type field 505 shown in FIG. 5 and stores start time Td and continuation time Ta in the start time field 509 and continuation time field 511 respectively (413).

On the other hand, when the relay is not possible, the relay control section 2063 controls the relay control signal generation section 2065 and generates a relay control signal (NG signal) notifying the terminal apparatus 100 that the relay is not possible. That is, the relay control signal generation section 2065 generates an NG signal which stores the fact that the signal is a relay OK/NG signal in the signal type field 505 and stores an NG in the OK/NG field 507 (413).

The relay control signal (reception possibility inquiry signal or NG signal) generated in this way is modulated by the modulation section 210, subjected to predetermined radio transmission processing (D/A conversion, up-conversion, etc.) by the radio transmission section 214, the reception possibility inquiry signal is sent to the terminal apparatus 100b (415) and the NG signal is sent to the terminal apparatus 100 (417). Though omitted in the figure, it is also possible to perform carrier sensing as with the terminal apparatus 100 when sending a reception possibility inquiry signal or NG signal. Furthermore, in the sequence diagram of FIG. 4, solid lines indicate cases where relay is possible and dotted lines indicate cases where relay is not possible. In a case where relay is not possible, an NG signal is received by the radio reception section 114 through the antenna of the terminal apparatus 100, demodulated by the demodulation section 116 and decided to be an NG signal by the relay control signal analysis section 1024. Then, processing by the terminal apparatus 100 is reset (419) and the transmission control section 1021 re-determines the start time of transferring the information signal.

When the reception possibility inquiry signal is sent to the terminal apparatus 100b, the reception possibility inquiry signal is received by the radio reception section 114 through the antenna of the terminal apparatus 100b, demodulated by the demodulation section 116 and the relay control signal analysis section 1024 identifies that the signal is a reception possibility inquiry signal.

When the signal is identified as a reception possibility inquiry signal, the transmission control section 1021 checks whether any signal is scheduled to be received or not from other terminal apparatuses during a relay time of the start time Td and continuation time Ta, and when no signal is scheduled to be received from other terminal apparatuses, it is decided that reception is possible and when a signal is scheduled to be received from other terminal apparatuses, it is decided that reception is not possible (421).

When reception is possible, the transmission control section 1021 controls the relay control signal generation section 1023 and generates a relay control signal (OK signal) notifying the relay apparatus 200 that reception is possible. That is, the relay control signal generation section 1023 generates an OK signal which stores the fact that the signal is a reception OK/NG signal in the signal type field 505 and stores an OK in the OK/NG field 507 (423).

On the other hand, when reception is not possible, the transmission control section 1021 controls the relay control signal generation section 1023 and generates a relay control signal (NG signal) for notifying the relay apparatus 200 that reception is not possible. That is, the relay control signal generation section 1023 generates an NG signal which stores the fact that the signal is a reception OK/NG signal in the signal type field 505 and stores an NG in the OK/NG field 507 (423).

The relay control signal (OK signal or NG signal) generated in this way is modulated by the modulation section 108 and sent from the radio transmission section 110 to the relay apparatus 200 through the antenna (425). Though omitted in the figure, it is also possible to perform carrier sensing as with the terminal apparatus 100 when an OK signal or NG signal is sent.

When the OK/NG signal is sent to the relay apparatus 200, the OK/NG signal is received by the radio reception section 202 through the antenna of the relay apparatus 200, demodulated by the demodulation section 204 and the relay control signal analysis section 2061 identifies that the signal is a reception OK/NG signal.

When the signal is identified as an OK/NG signal, the relay control section 2063 updates the reservation table 2064 and records the possibility of reception by the terminal apparatus 100b about the relay from the terminal apparatus 100 to the terminal apparatus 100b (427). Furthermore, the relay control section 2063 controls the relay control signal generation section 2065 and generates a relay control signal (OK/NG signal) for notifying the terminal apparatus 100 of the possibility of reception/relay. That is, the relay control signal generation section 2065 generates an OK/NG signal which stores the fact that the signal is a relay OK/NG signal in the signal type field and stores an OK/NG in the OK/NG field (429).

The relay control signal (OK signal or NG signal) generated in this way is modulated by the modulation section 210, sent from the radio transmission section 214 to the terminal apparatus 100 through the antenna (431, 433). Though omitted in the figure, it is also possible to perform carrier sensing as with the terminal apparatus 100 when sending an OK signal or NG signal. Furthermore, as described above, in the case where relay is not possible (when the terminal apparatus 100 receives an NG signal (431)), the transmission control section 1021 of the terminal apparatus 100 re-determines the start time of transmission of an information signal.

Furthermore, when relay is possible (when the terminal apparatus 100 receives an OK signal (433)), the OK signal is received by the radio reception section 114 through the antenna of the terminal apparatus 100, demodulated by the demodulation section 116 and the relay control signal analysis section 1024 identifies the signal as an OK signal.

This means that the path necessary to transmit an information signal at the start time Td and continuation time Ta has been reserved. That is, in a period from the start time Td to the continuation time Ta, if an information signal is transmitted from the terminal apparatus 100 to the terminal apparatus 100b through the relay apparatus 200, when the information signal is received by the relay apparatus 200, the information signal is immediately sent without being stored.

Thus, the terminal apparatus 100 transmits an information signal to the terminal apparatus 100b through the relay apparatus 200 during this time. More specifically, the transmission control section 1021 detects that the counter value of the counter 1025 which has started a countdown simultaneously with a relay possibility inquiry signal has become 0 (435), the information signal generated by the information signal generation section 104 is modulated by the modulation section 104 at the same time as the counter value becomes 0, subjected to predetermined radio transmission processing (D/A conversion, up-conversion, etc.) by the radio transmission section 110 and sent through the antenna (437).

Transmission of the information signal continues for the continuation time Ta and the transmitted information signal is received by the radio reception section 202 through the antenna of the relay apparatus 200. At this time, the reservation table 2064 has recorded the fact that the signal would be relayed from the terminal apparatus 100 to the terminal apparatus 100b for the continuation time Ta from the start time Td, and therefore the switch 208 is connected by the relay control section 2063 during this time.

Therefore, the information signal received by the radio reception section 202 is output to the amplification section 212 and amplified and sent from the radio transmission section 214 to the terminal apparatus 100*b* through the antenna. In this way, the switch 208 is connected only when there is some information signal to be relayed, which prevents a signal which need not be relayed by the relay apparatus 200 from being received and transmitted after amplification and prevents interference with the terminal apparatus and other relay apparatus from increasing.

The information signal relayed by the relay apparatus 200 is received by the radio reception section 114 through the antenna of the terminal apparatus 100*b* demodulated by the demodulation section 118 and information data is obtained.

Next, the operation of reserving the path for relaying an information signal by the relay apparatus 200 will be explained more specifically with reference to the flow chart shown in FIG. 7.

The relay apparatus 200 receives three types of relay control signal; the relay possibility inquiry signal transmitted from the terminal apparatus 100, the OK signal sent from the terminal apparatus 100*b* indicating that reception is possible and the NG signal sent from the terminal apparatus 100*b* indicating that reception is not possible.

When a relay control signal is received by the radio reception section 202 of the relay apparatus 200 (ST1000) the relay control signal is demodulated by the demodulation section 204 and the signal type field 505 of the relay control signal is referenced by the relay control signal analysis section 2061 to decide whether the signal is a relay possibility inquiry signal or OK/NG signal (ST1100).

When the signal type field 505 is a relay possibility inquiry signal, the relay time required by the terminal apparatus 100 is perceived from the start time field 509 and continuation time field 511 of this relay possibility inquiry signal (ST1200). The relay information during the perceived relay time is recorded in the reservation table 2064 and the reservation table 2064 is referenced by the relay control section 2063 (ST1300).

With reference to the reservation table 2064, the relay control section 2063 perceives other scheduled relay if any within the continuation time from the start time specified by the received relay possibility inquiry signal to decide whether relay is possible or not (ST1400)

When the result of this decision shows that no other relay is scheduled within the continuation time from the start time specified by the received relay possibility inquiry signal, a reception possibility inquiry signal for inquiring whether reception of the terminal apparatus at the destination is possible or not is generated and sent from the radio transmission section 214 to the terminal apparatus 100*b* (ST1500).

On the other hand, when the decision result in ST1400 shows that other relay is scheduled, the path for transmitting an information signal cannot be reserved and an NG signal is transmitted from the radio transmission section 214 to the terminal apparatus 100 (ST1700).

Furthermore, when the signal type field 505 is an OK/NG signal in the decision of ST1100, the OK/NG field 507 of this OK/NG signal is referenced (ST1600).

When the OK/NG field 507 is NG, though the relay by the relay apparatus 200 is possible, reception by the terminal apparatus 100*b* at the destination is impossible, and therefore an NG signal is generated through the relay control signal generation section 2065 and sent to the terminal apparatus 100 of the sender (ST1700).

On the other hand, when the OK/NG field 507 is OK, both relay by the relay apparatus 200 and reception by the terminal apparatus 100*b* at the destination are possible, and therefore the relay control section 2063 updates the reservation table 2064 (ST1800), the relay control signal generation section 2065 generates an OK signal and sends the OK signal to the terminal apparatus 100 of the sender (ST1900).

Here, an example of the reservation table 2064 is shown in FIG. 8. As shown in the figure, the reservation table 2064 stores a destination address 801 which becomes the destination of the information signal, a sender address 803 of the terminal apparatus which is the sender of the information signal, and information on relay made up of a start time 805 at which the relay of the information signal starts and a continuation time 807 during which the relay of the information signal continues, whether relay is possible or not 809 at the terminal apparatus 200 and whether reception is possible or not 811 by the terminal apparatus at the destination.

More specifically, in the case of relay from, for example, the terminal apparatus A to the terminal apparatus B, which continues for a continuation time Ta1 from the start time Td1, the relay apparatus 200 has no other relay scheduled for this time, and therefore the relay decision 809 is OK. Furthermore, in the case of relay from the terminal apparatus D to the terminal apparatus C, which continues for a continuation time Ta2 from a start time Td2, relay at the relay apparatus 200 is possible and reception at the terminal apparatus C is also possible (that is, an OK signal is received from the terminal apparatus C), both the relay decision 809 and reception decision 811 at the destination terminal are OK.

Therefore, when the received relay control signal is an OK signal, an OK status is stored in the column of the reception decision 811 of the destination terminal on the row of the relevant relay of the reservation table 2064. In this way, the relay apparatus 200 can reliably relay an information signal by controlling the relay start time and continuation time about the relay requested from the terminal apparatus, possibility of relay and possibility of reception by the terminal apparatus at the destination using the reservation table in a unified manner.

Thus, according to this embodiment, when there is an information signal to be transmitted between the terminal apparatuses through the relay apparatus, the terminal apparatus of the sender inquires the relay apparatus about the possibility of relay through a relay control signal, and further the relay apparatus inquires the terminal apparatus at the destination about the possibility of reception, and if relay/reception is possible, in other words, when the transmission path of the information signal is reserved, the information signal is transmitted. For this reason, when relay is performed on a radio communication network carrying out a bidirectional communication at the same frequency, it is possible to realize relay with the reduced size of the apparatus, reduced waste of time without temporally switching between transmission and reception.

Furthermore, this system is different from a repeater hub used for relay of wired communication that performs retransmission in the event of collision, and therefore it is possible to improve the transmission efficiency. Furthermore, since relay by radio at the same frequency allows no relay delay, it is not possible to recognize the destination and perform relay from the relay control signal received simultaneously with the information signal. However, this embodiment allows relay with high transmission efficiency at the same frequency in a radio communication.

Figure 9:
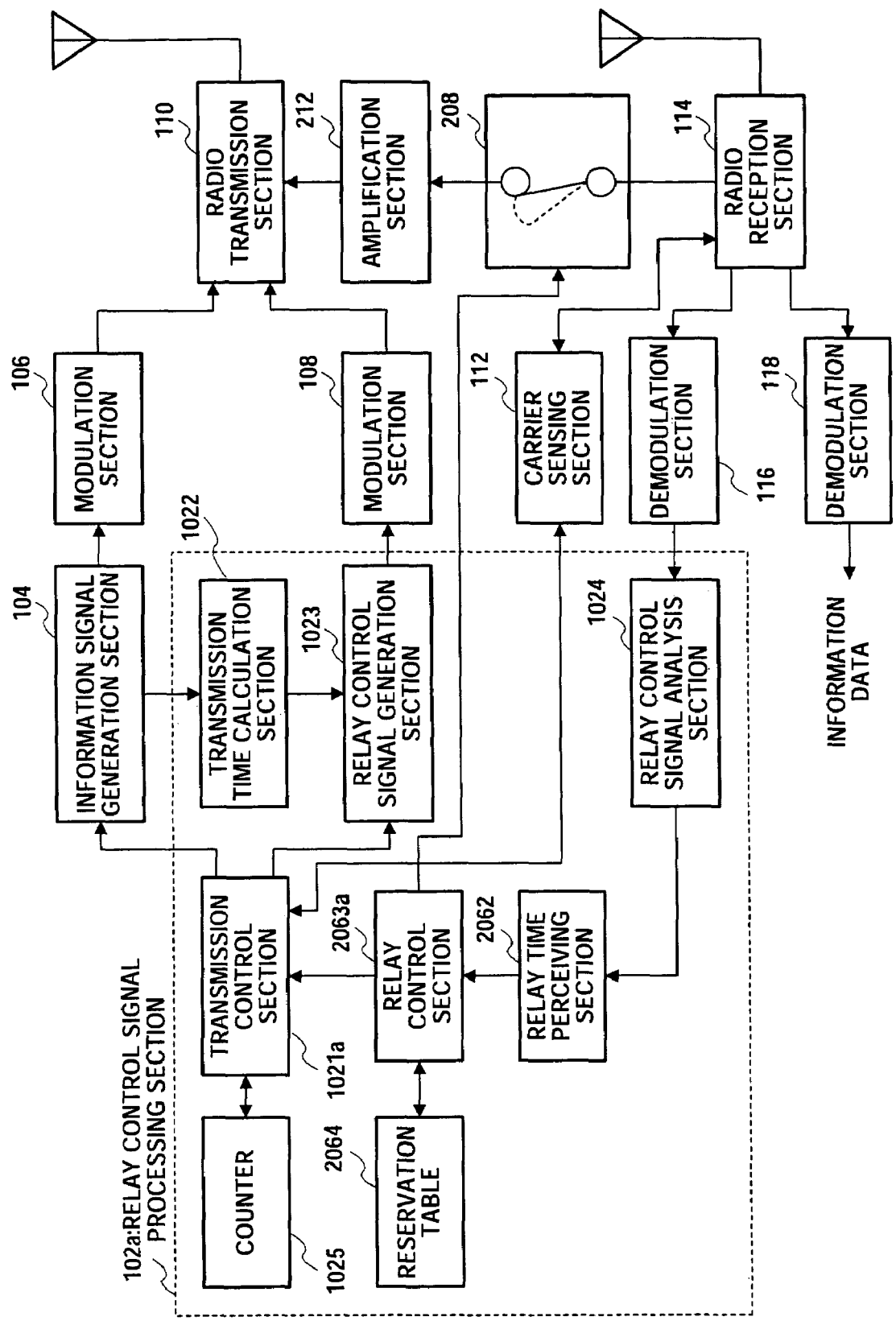
FIG. 9 is a block diagram showing another configuration of the terminal apparatus according to Embodiment 1.

This embodiment adopts a configuration in which the terminal apparatus and relay apparatus are treated as independent bodies, but as shown in FIG. 9, for example, it is also possible to construct the terminal apparatus integral with relay apparatus. FIG. 9 is a combination of the terminal apparatus 100 shown in FIG.2 and the relay apparatus 200 shown in FIG.3 and the same parts as those in FIG.2 and FIG.3 are assigned the same reference numerals.

In FIG.9, the relay control signal processing section 102a has the function combining the relay control signal processing section 102 shown in FIG. 2 and the relay control signal processing section 206 shown in FIG.3.

That is, the transmission control section 1021a controls the transmission of an information signal, a relay possibility inquiry signal inquiring the possibility of relay of this information signal and an OK/NG signal in response to the reception possibility inquiry signal from the other apparatus and the relay control section 2063a controls the connection of the switch 208 according to the relay control signal from the other apparatus.

In this way, constructing the terminal apparatus integral with the relay apparatus makes it possible to construct a communication network flexibly.

Embodiment 2

A feature of Embodiment 2 of the present invention is to perform relay with a simple configuration without using any reservation table in deciding the possibility of relay and assumes the use of a procedure such as a DLP (Direct Link Protocol).

The relay apparatus according to this embodiment has the configuration of the relay apparatus 200 shown in FIG. 3 with the reservation table 2064 of the relay control signal processing section 206 removed.

This embodiment does not use any reservation table and prohibits transmission of a signal during a transmission prohibition period called "NAV (Network Allocation Vector)". That is, each apparatus notifies other apparatuses of a scheduled period during which a radio channel and the other apparatuses do not send any signal during that period it is thereby possible to avoid collision of signals.

When two terminal apparatuses such as the terminal apparatus 100 and terminal apparatus 100b in FIG. 1 are in positions that they cannot directly communicate with each other, a relay apparatus 200 executes a DLP. That is, a DLP request signal generated by the relay control signal generation section 1023 of the terminal apparatus 100 is sent to the relay apparatus 200 and when the terminal apparatus 100b is within a communicating distance, the relay apparatus 200 transfers a DLP request signal from the terminal apparatus 100 to the terminal apparatus 100b.

Then, when the terminal apparatus 100b accepts this DLP request, the relay control signal generation section 1023 of the terminal apparatus 100b generates a DLP response signal including the destination addresses of the terminal apparatus 100 and the terminal apparatus 100b and sends the destination addresses to the relay apparatus 200. The relay apparatus 200 transfers this DLP response signal to the terminal apparatus 100. The DLP request signal which is a relay control signal and DLP response signal are stored in the relay apparatus 200 once and relayed. That is, the DLP request signal and DLP response signal are relayed in the procedure similar to the conventional relay operation.

In this way, after a DLP setup is completed, the terminal apparatus 100 and terminal apparatus 100b cannot perform direct communication, and therefore the relay apparatus 200 operates as the terminal apparatus which becomes the party on the other end for the respective terminal apparatuses.

The procedure of the DLP will be explained by taking a case as an example where communication is performed with a DCF (Distributed Coordination Function) which is an access control scheme assuming collision of signals to be transmitted/received as a precondition.

When an information signal is sent from the terminal apparatus 100, the carrier sensing section 112 performs carrier sensing and after confirming that no signal is transmitted from the other terminal apparatuses (for example, terminal apparatus 100a), the RTS (Request To Send: transmission request) signal generated by the relay control signal generation section 1023 is transmitted. The RTS signal includes information on a transmission continuation time (NAV) during which the terminal apparatus 100 transmits the information signal.

Then, since the RTS signal does not directly arrive at the terminal apparatus 100b, the RTS signal is received by the radio reception section 202 of the relay apparatus 200. When the relay apparatus 200 receives the RTS signal, it is decided that the relay control signal received by the relay control signal analysis section 2061 is the RTS signal. Then, the relay time perceiving section 2062 perceives the information on the NAV included in the RTS signal and notifies the relay control section 2063 of the NAV information.

Then, the NAV is stored by the relay control section 2063 and the relay control section 2063 controls the relay control signal generation section 2065 so as to generate a CTS (Clear To Send: reception preparation completed) signal. The CTS signal generated is originally to be sent by the terminal apparatus 100b which is the party on the other end of the terminal apparatus 100, but in this embodiment, the relay apparatus 200 sends back the CTS signal as a relay control signal instead of the terminal apparatus 100b.

Then, after a lapse of a certain time (short frame interval) called "SIFS (Short Inter Frame Space)" after the transmission of the RTS signal, the transmission of the information signal generated by the information signal generation section 104 of the terminal apparatus 100 is started. Since the transmission continuation time (NAV) of the information signal from the terminal apparatus 100 is stored in a duration field included in the header of the RTS signal, as a result of the RTS signal being analyzed by the relay control signal analysis section 2061, the relay start time (after a lapse of SIFS after reception of RTS signal) and end time are calculated by the relay time perceiving section 2062. Then, the switch 208 is connected only for a period of the NAV during which the information signal is transmitted by the relay control section 2063.

Here, if the sender address of the CTS signal sent back from the relay apparatus 200 to the terminal apparatus 100 is set to the address of the terminal apparatus 100b instead of the address of the relay apparatus 200, the terminal apparatus 100 on the transmitting side only needs to operate in the same way as the conventional one without being aware of the existence of the relay apparatus 200.

On the other hand, the terminal apparatus 100b detects the fact that the CTS signal which should originally be sent back from the own apparatus is sent back from the relay apparatus 200 and prepares for reception of an information signal from the terminal apparatus 100 transmitted through the relay apparatus 200 after a lapse of SIFS.

The terminal apparatus 100b on the receiving side carries out demodulation and an error check on the information signal, and when it is decided that there is no error, the terminal apparatus 100b sends back an ACK frame, SIFS after completion of the NAV of the information signal. Then, the relay control section 2063 of the relay apparatus 200 connects the switch 208 at an ACK frame transmission timing from the terminal apparatus 100b. At this timing, too, the relay control section 2063 of the relay apparatus 200 stores the NAV and since the SIFS is known, the SIFS need not be notified to the relay apparatus 200 again.

Here, even when a communication is carried out according to an access control scheme called "PCF (Point Coordination Function: access control function using concentrated control)", it is possible to carry out communication in the same way as the aforementioned case of DCF by the relay apparatus 200 executing operation as the terminal apparatus 100b on the receiving side in addition to the operation as an access point.

When the terminal apparatus 100 and the terminal apparatus 100b can directly communicate with each other, if the relay apparatus 200 responds, two apparatuses (terminal apparatus 100b and relay apparatus 200) send back CTS signals, which results in interference. Therefore, it is preferable to provide a reference beforehand when the relay apparatus 200 responds.

Furthermore, according to this embodiment, even if the CTS signal corresponding to the RTS signal from the terminal apparatus 100 is not sent back after the setup of DLP is completed, the terminal apparatus 100 does not end the DLP mode. When the CTS signal is not sent back, the relay apparatus 200 relays the information signal amplified without storing to thereby notify the terminal apparatus 100 that it is possible to establish a pseudo-DLP mode.

At this time, the method of notifying the terminal apparatus 100 is not particularly limited and, for example, when the reply of the CTS signal is not confirmed by the terminal apparatus 100, the terminal apparatus 100 is specified so as to retransmit an RTS signal and when the second RTS signal is received by the relay apparatus 200, the relay apparatus 200 may be specified so as to send back a CTS signal instead of the terminal apparatus 100b. Furthermore, it is also possible to specify so that an explicit signal indicating that communication in a pseudo-DLP mode is sent from the relay apparatus 200 to the terminal apparatus 100.

This embodiment assumes that the terminal apparatus 100 includes a list of directly communicable terminal apparatuses and update the list, but if the terminal apparatus 100 holds a list of terminal apparatuses communicable with the relay apparatus 200, the frequency with which communication is realized in a pseudo-DLP mode increases with the result that it is possible to effectively use the spectrum.

Embodiment 3

A feature of Embodiment 3 of the present invention is to superimpose a relay control signal and information signal on a plurality of subcarriers whose frequencies are orthogonal to one another to carry out transmission according to an OFDM (Orthogonal Frequency Division Multiplex) scheme.

Figure 10:
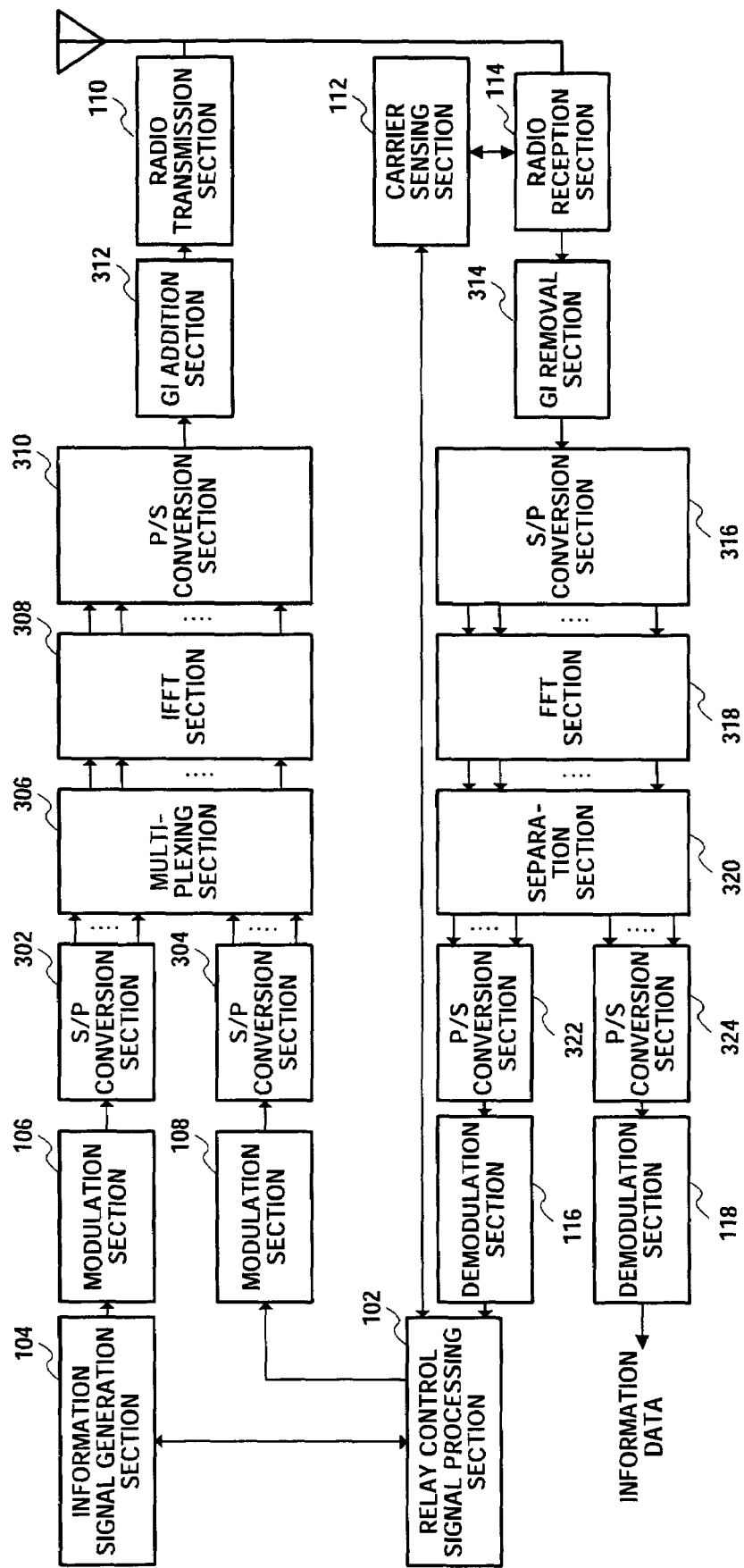
FIG. 10 is a block diagram showing a configuration of a terminal apparatus according to Embodiment 3 of the present invention.

FIG. 10 is a block diagram showing a configuration of a terminal apparatus according to Embodiment 3 of the present invention. In the same figure, the same parts as those in FIG. 2 are assigned the same reference numerals and explanations thereof will be omitted. The terminal apparatus shown in FIG. 10 is provided with a relay control signal processing section 102, an information signal generation section 104, a modulation section 106, a modulation section 108, an S/P conversion section 302, an S/P conversion section 304, a multiplexing section 306, an IFFT (Inverse Fast Fourier Transform) section 308, a P/S conversion section 310, a GI (Guard Interval) addition section 312, a radio transmission section 110, a carrier sensing section 112, a radio reception section 114, a GI removal section 314, an S/P conversion section 316, an FFT (Fast Fourier Transform) section 318, a separation section 320, a P/S conversion section 322, a P/S conversion section 324, a demodulation section 116 and a demodulation section 118. In FIG. 10, the internal configuration of the relay control signal processing section 102 is the same as that in FIG. 2, which is therefore omitted.

The S/P conversion section 302 S/P-converts the modulated information signal and outputs a parallel information signal.

The S/P conversion section 304 S/P-converts the modulated relay control signal and outputs a parallel relay control signal.

The multiplexing section 306 multiplexes the parallel information signal with parallel relay control signal and outputs a parallel multiplexed signal.

The IFFT section 308 inverse fast Fourier transforms the parallel multiplexed signal and superimposes the information signal and relay control signal on a plurality of subcarriers whose frequencies are orthogonal to one another.

The P/S conversion section 310 P/S-converts the plurality of subcarriers with the information signal and relay control signal superimposed and outputs a serial signal.

The GI addition section 312 replicates the end part of the serial signal, adds it to the start as a guard interval and generates an OFDM signal.

The GI removal section 314 removes the guard interval from the received signal.

The S/P conversion section 316 S/P-converts the signal from which the guard interval has been removed and separates the signal into parallel signals corresponding to their respective subcarriers.

The FFT section 318 fast Fourier transforms the parallel signals corresponding to their respective subcarriers and extracts signals superimposed on the respective subcarriers.

The separation section 320 separates the signal extracted by the FFT section 318 into the information signal and the relay control signal included therein.

The P/S conversion section 322 P/S-converts the relay control signal and outputs a serial relay control signal.

The P/S conversion section 324 P/S-converts the information signal and outputs a serial information signal.

Figure 11:
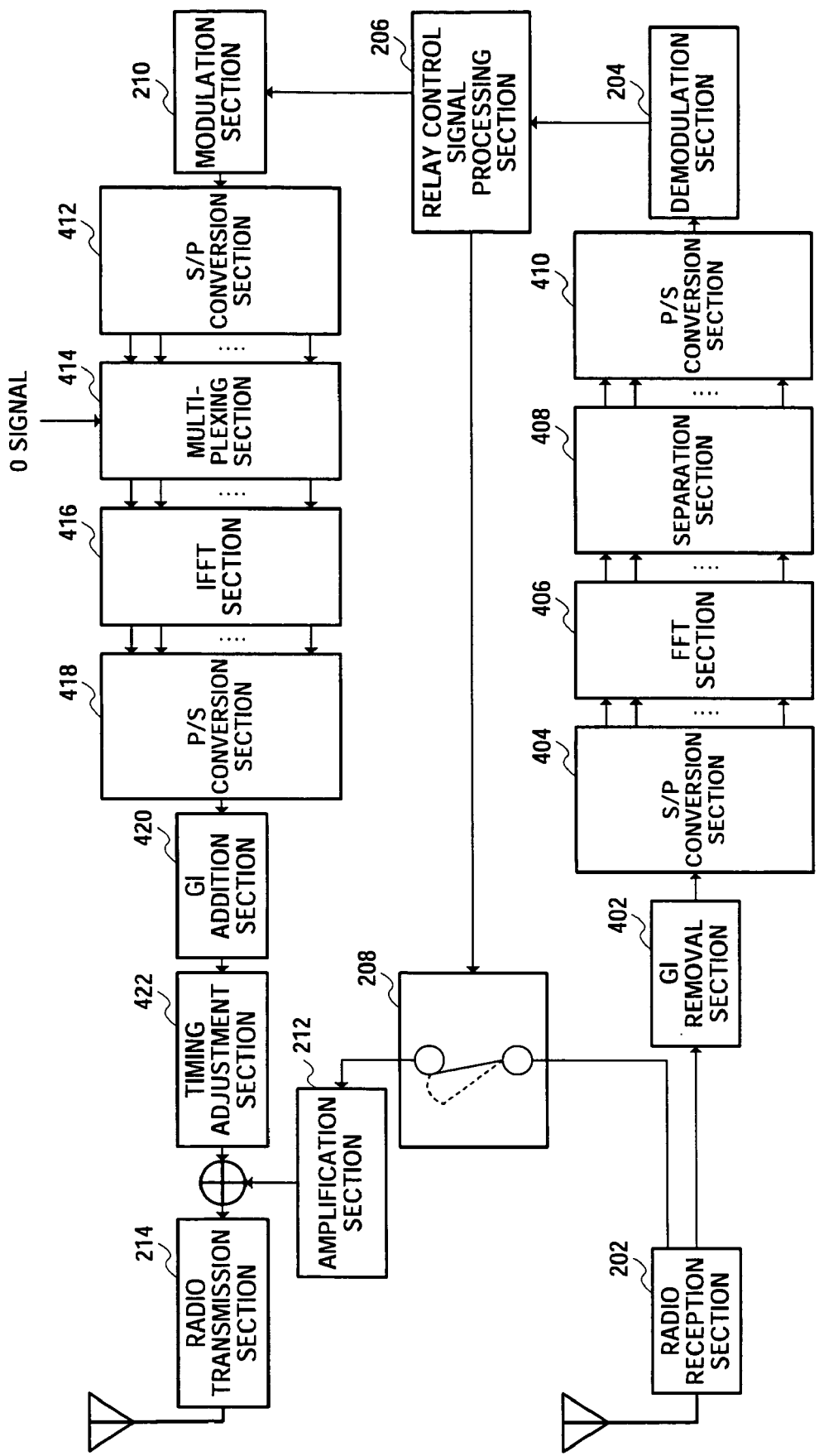
FIG. 11 is a block diagram showing a configuration of a relay apparatus according to Embodiment 3.

FIG. 11 is a block diagram showing a configuration of a relay apparatus according to Embodiment 3. In the same figure, the same parts as those in FIG. 3 are assigned the same reference numerals and explanations thereof will be omitted. The relay apparatus shown in FIG. 11 is provided with a radio reception section 202, a GI removal section 402, an S/P conversion section 404, an FFT section 406, a separation section 408, a P/S conversion section 410, a demodulation section 204, a relay control signal processing section 206, a switch 208, a modulation section 210, an S/P conversion section 412, a multiplexing section 414, an IFFT section 416, a P/S conversion section 418, a GI addition section 420, a timing adjustment section 422, an amplification section 212 and a radio transmission section 214. In FIG. 11, the internal configuration of the relay control signal processing section 206 is the same as that in FIG. 3, and is therefore omitted.

The GI removal section 402 removes a guard interval from a received signal.

The S/P conversion section 404 S/P-converts the signal from which the guard interval has been removed and separates the signal into parallel signals corresponding to their respective subcarriers.

The FFT section 406 fast Fourier transforms the parallel signals corresponding to their respective subcarriers and extracts signals superimposed on the respective subcarriers.

The separation section 408 separates the signal extracted by the FFT section 406 into the information signal and the relay control signal included therein and outputs only the relay control signal.

The P/S conversion section 410 P/S-converts the relay control signal and outputs a serial relay control signal.

The S/P conversion section 412 S/P-converts the modulated relay control signal and outputs a parallel relay control signal.

The multiplexing section 414 multiplexes the parallel relay control signal with a 0 signal and outputs a parallel multiplexed signal. The 0 signal is a signal having no information and an information signal is added to the part multiplexed with the 0 signal in the subsequent stage.

The IFFT section 416 inverse fast Fourier transforms the parallel multiplexed signal and superimposes the 0 signal and relay control signal on a plurality of subcarriers whose frequencies are orthogonal to one another.

The P/S conversion section 418 P/S-converts the plurality of subcarriers with the 0 signal and relay control signal superimposed and outputs a serial signal.

The GI addition section 420 replicates the end part of the serial signal, adds it to the start as a guard interval and generates an OFDM signal.

The timing adjustment section 422 adjusts an output timing of an OFDM signal including the 0 signal and relay control signal so that orthogonality with the information signal output from the amplification section 212 is kept.

Figure 12:
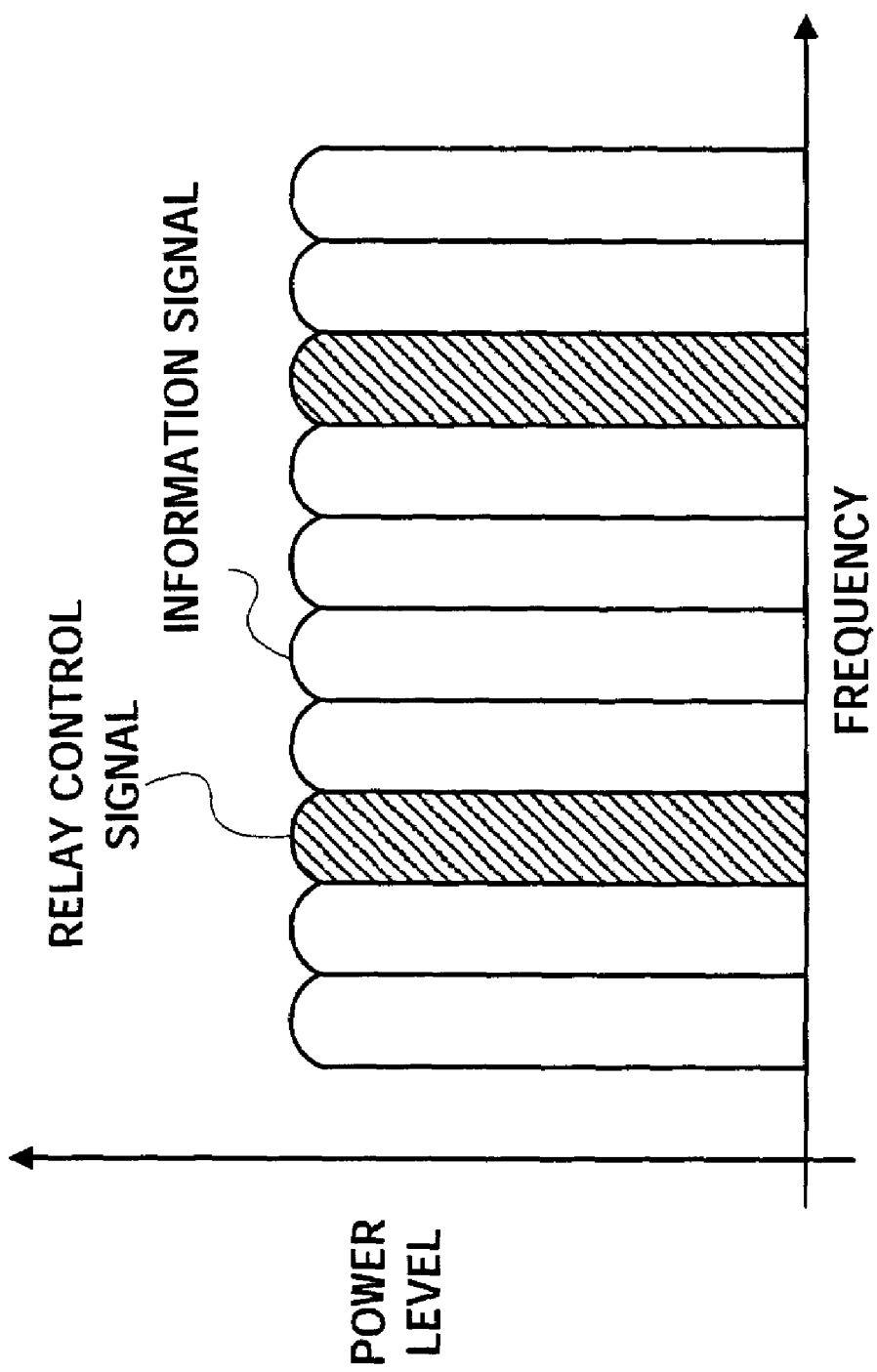
FIG. 12 illustrates an example of use of a frequency band according to Embodiment 3.

In this embodiment, the signal transmitted/received by the terminal apparatus via the relay apparatus is a signal modulated according to an OFDM scheme. As shown in FIG. 12, the signal modulated according to an OFDM scheme is generated with an information signal and relay control signal superimposed on a plurality of subcarriers whose frequencies are orthogonal to one another.

In order to generate such an OFDM signal, at the terminal apparatus (FIG. 10), the information signal and relay control signal are S/P-converted by the S/P conversion section 302 and S/P conversion section 304, multiplexed by the multiplexing section 306 and inverse fast Fourier transformed by the IFFT section 308. Here, the information signal and relay control signal are multiplexed and transmitted simultaneously. This relay control signal is not related to relay of an information signal transmitted simultaneously but related to relay of an information signal to be transmitted later.

Furthermore, the relay control signal has a smaller amount of information than the information signal, and therefore as shown with shaded areas in FIG. 12, it is possible to assign fewer subcarriers than information signals to relay control signals. Furthermore, by causing frequencies of subcarriers to be assigned to the relay control signals to greatly vary from one another, it is possible to reduce the influence of frequency selective fading. Such subcarrier assignment can be realized by adjusting S/P conversions by the S/P on version section 302 and S/P conversion section 304.

On the other hand, when the relay apparatus (FIG. 11) receives an OFDM signal, the FFT section 406 fast Fourier transforms the signal whose guard interval has been removed by the GI removal section 402 and only subcarriers with relay control signals superimposed by the separation section 408 are output.

Then, processing on the relay control signal is carried out as with Embodiment 1 and the relay control signal generated by the relay control signal processing section 206 is S/P-converted by the S/P conversion section 412, multiplexed with a 0 signal by the multiplexing section 414 and inverse fast Fourier transformed by the IFFT section 416. Here, the relay control signal is multiplexed with the 0 signal with no information, but this 0 signal is replaced by an information signal amplified by the amplification section 212 in the subsequent stage.

The inverse Fourier transformed signal is given a guard interval by the GI addition section 420 and output with a timing thereof adjusted by the timing adjustment section 422. Through timing adjustment by the timing adjustment section 422, the output of the relay control signal is delayed so as to provide a timing that satisfies orthogonality between the output relay control signal and the information signal amplified by the amplification section 212. The timing adjustment section 422 may also be adapted so as to output a relay control signal at a timing at which the relay apparatus does not transmit/receive the information signal instead of a timing that satisfies orthogonality between the relay control signal and information signal. By so doing, the information signal and relay control signal are not only superimposed on subcarriers with different frequencies but also have different transmission timings, and therefore it is easier to separate the information signal from the relay control signal.

Thus, according to this embodiment, when an OFDM signal is generated with an information signal and relay control signal superimposed on a plurality of subcarriers having frequencies orthogonal to one another, fewer subcarriers are assigned to the relay control signal than information signals, the frequencies of the subcarriers assigned to the relay control signal are considerably different, and therefore there is no need to reserve a frequency band different from that of the information signal to transmit the relay control signal, thus making it possible to improve the spectrum utilization efficiency, remove influences of frequency selective fading and reserve the path necessary to relay the information signal accurately.

This embodiment may also be adapted so that the signal received by the radio reception section 202 of the relay apparatus shown in FIG. 11 passes through a notch filter (not shown) and the frequencies of the subcarriers with the relay control signal superimposed by the notch filter is attenuated and the signal obtained may be amplified by the amplification section 212 and relayed.

In this case, the characteristic of the notch filter may periodically attenuate frequencies by periodically superimposing the relay control signal on the plurality of subcarriers, and therefore it is possible to effectively attenuate the relay control signal with a relatively small circuit. Furthermore, it is also possible to prevent the relay control signal from being relayed to the other relay apparatus or terminal apparatus.

Embodiment 4

A feature of Embodiment 4 of the present invention is to spread, when a relay control signal and information signal are superimposed on a plurality of subcarriers whose frequencies are orthogonal to one another, only the relay control signal to carry out transmission according to an OFCDM (Orthogonal Frequency Code Division Multiplex) scheme.

Figure 13:
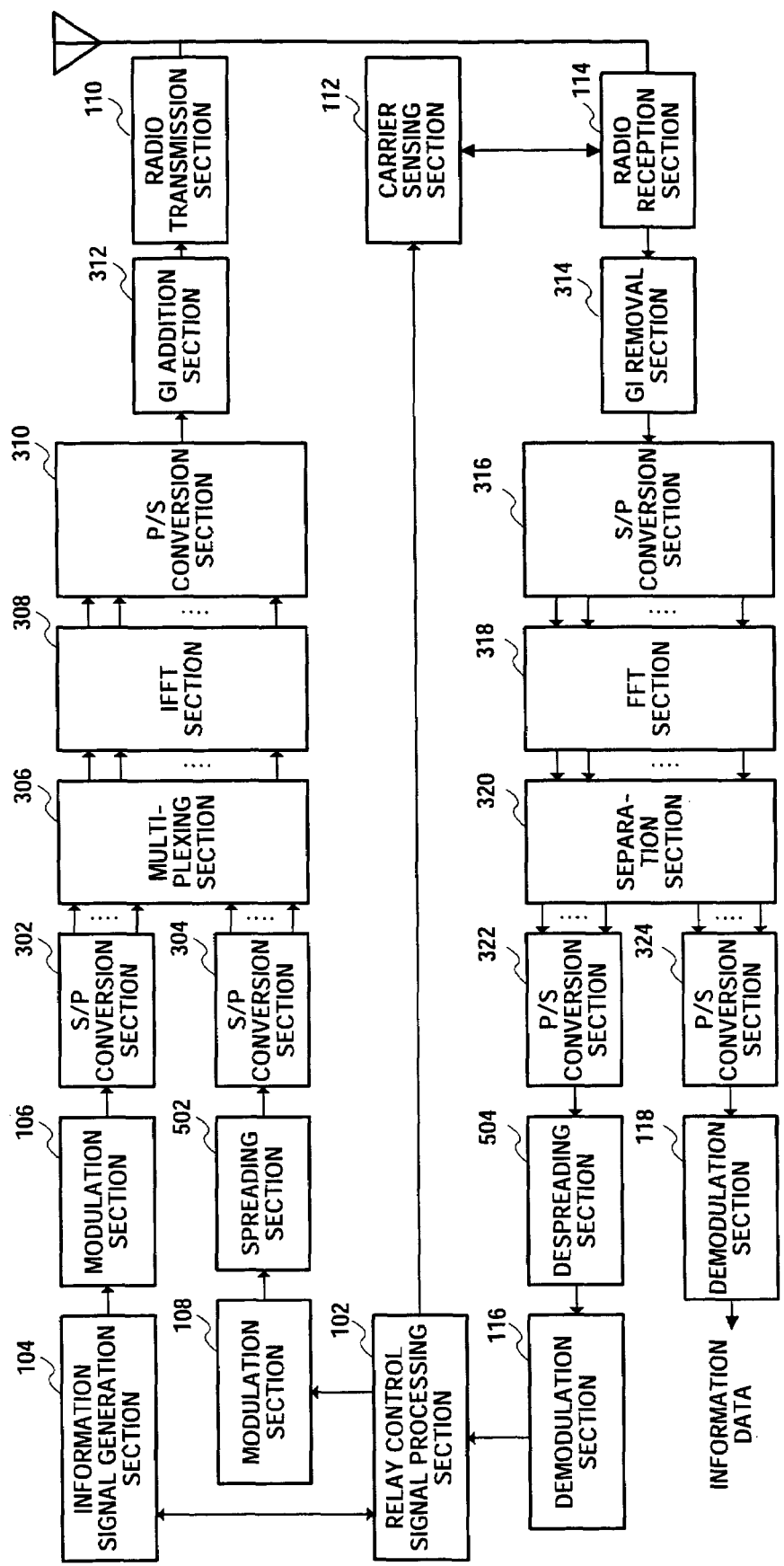
FIG. 13 is a block diagram showing a configuration of a terminal apparatus according to Embodiment 4 of the present invention.

FIG. 13 is a block diagram showing a configuration of a terminal apparatus according to Embodiment 4 of the present invention. In the same figure, the same parts as those in FIG. 2 and FIG. 10 are assigned the same reference numerals and explanations thereof will be omitted. The terminal apparatus shown in FIG. 13 corresponds to the terminal apparatus shown in FIG. 10 with a spreading section 502 and despreading section 504 added. In FIG. 13, the internal configuration of the relay control signal processing section 102 is the same as that in FIG. 2, and is therefore omitted.

The spreading section 502 spreads a relay control signal modulated by the modulation section 108 using a predetermined spreading code.

The despreading section 504 despreads a serial relay control signal output from the P/S conversion section 322 using a spreading code used by a relay apparatus which will be described later for spreading.

Figure 14:
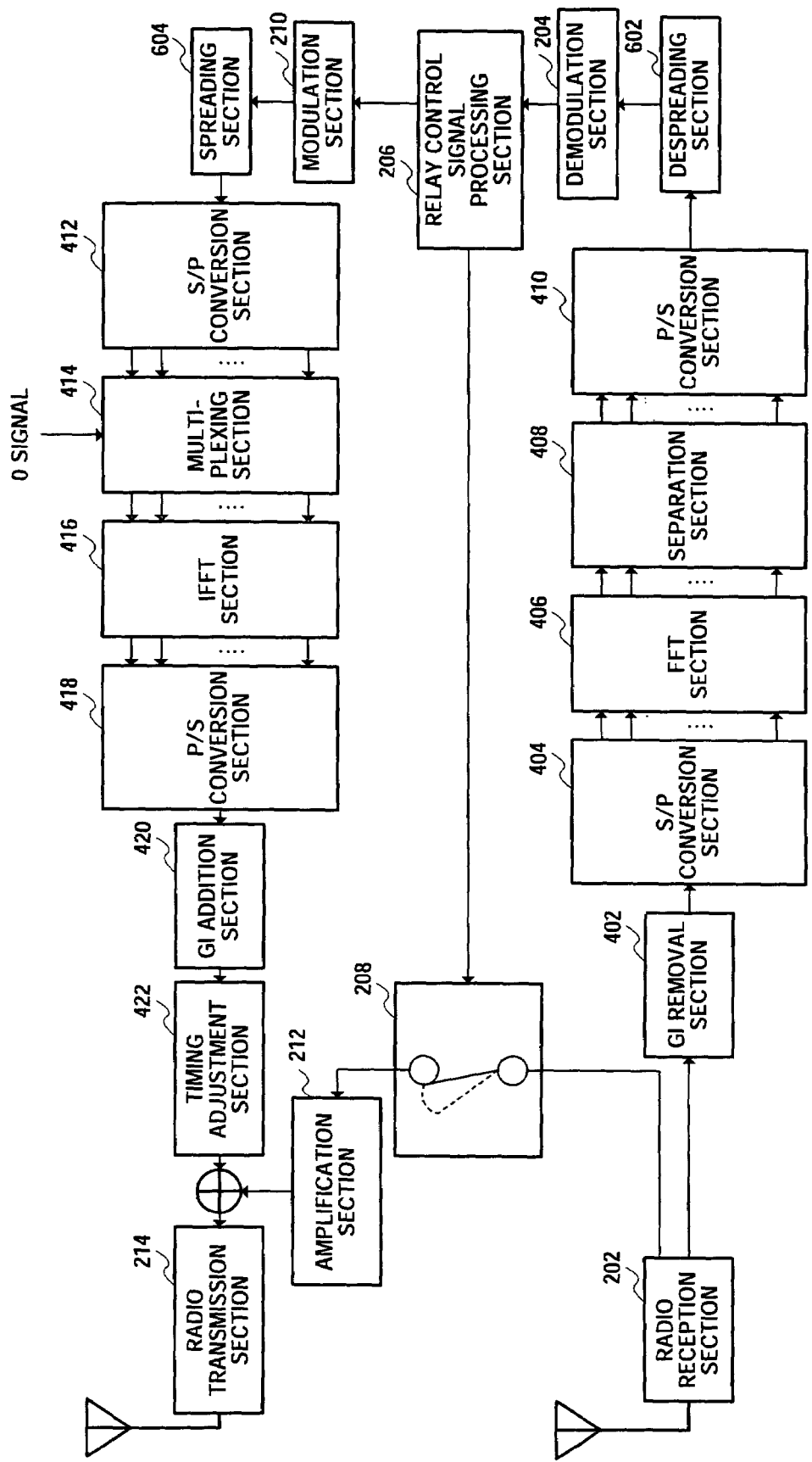
FIG. 14 is a block diagram showing a configuration of a relay apparatus according to Embodiment 4.

FIG. 14 is a block diagram showing a configuration of a relay apparatus according to Embodiment 4. In the same figure, the same parts as those in FIG. 3 and FIG. 11 are assigned the same reference numerals and explanations thereof will be omitted. The relay apparatus shown in FIG. 14 has the configuration of the relay apparatus shown in FIG. 11 with a despreading section 602 and spreading section 604 added. In FIG. 14, the internal configuration of the relay control signal processing section 206 is the same as that in FIG. 3, and is therefore omitted.

The despreading section 602 despreads a serial relay control signal output from a P/S conversion section 410 using the spreading code used by the terminal apparatus for spreading.

The spreading section 604 spreads a relay control signal modulated by the modulation section 210 using a predetermined spreading code. The spreading code used by the spreading section 604 for spreading may not be the same as the spreading code used by the spreading section 502 of the terminal apparatus.

Of the information signal and relay control signal, this embodiment only spreads the relay control signal into an OFCDM signal modulated according to an OFCDM scheme. Spreading the relay control signal can reduce interference due to information signals and relay control signal transmitted from other terminal apparatuses and relay apparatus and reserve the path necessary to relay information signals more accurately.

Thus, this embodiment spreads a relay control signal using a predetermined spreading code and further generates an OFCDM signal with information signals and relay control signals superimposed on a plurality of subcarriers, and can thereby improve the spectrum utilization efficiency, reduce interference in transmission of a relay control signal and reserve the path necessary to relay information signals more accurately.

Embodiment 5

A feature of Embodiment 5 of the present invention is to perform OFDM-based transmission for information signals and CDM (Code Division Multiplex)-based transmission for relay control signals.

Figure 15:
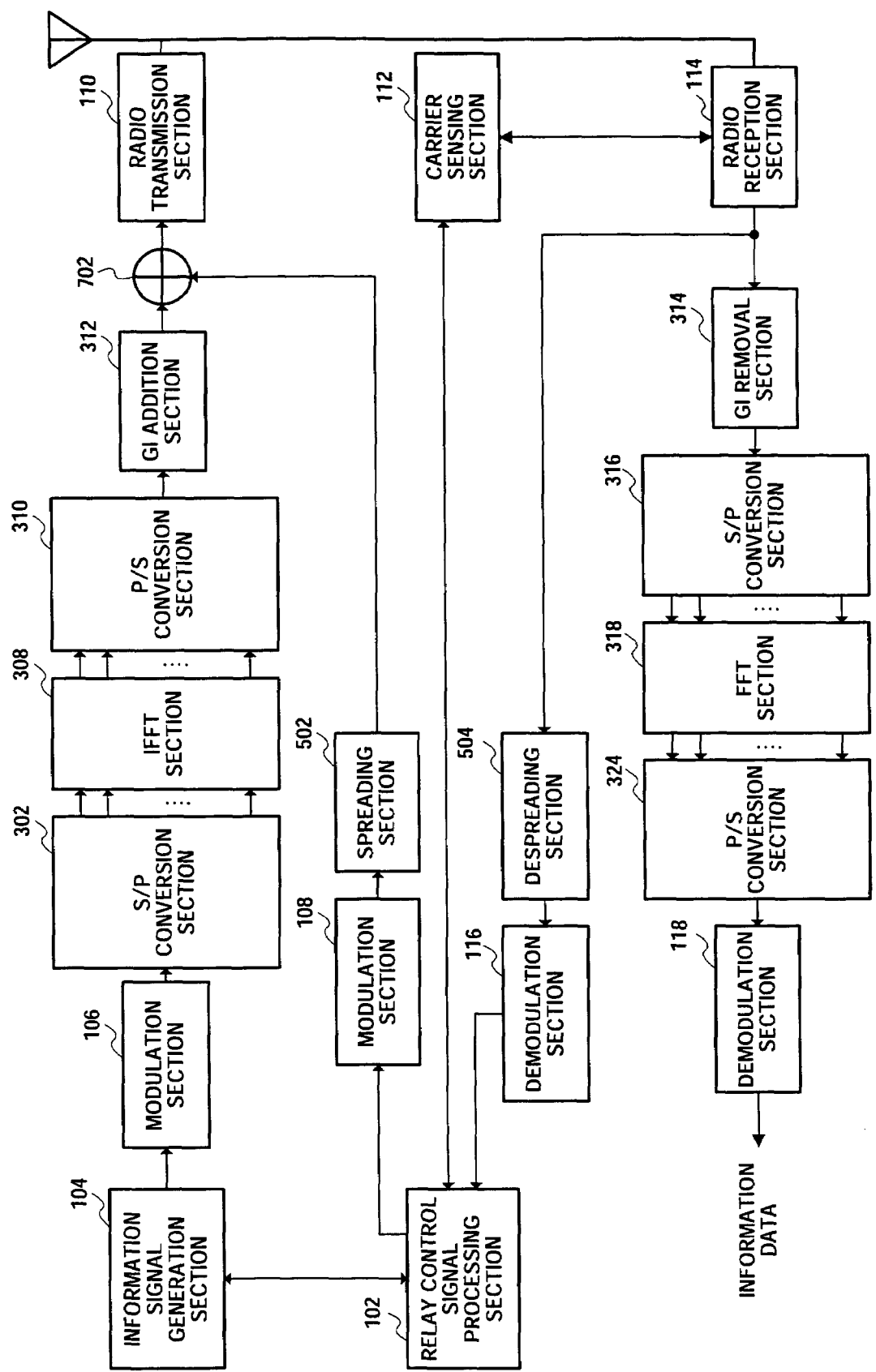
FIG. 15 is a block diagram showing a configuration of a terminal apparatus according to Embodiment 5 of the present invention.

FIG. 15 is a block diagram showing a configuration of a terminal apparatus according to Embodiment 5 of the present invention. In the same figure, the same parts as those in FIG. 2, FIG. 10 and FIG. 13 are assigned the same reference numerals and explanations thereof will be omitted. The terminal apparatus shown in FIG. 15 corresponds to the terminal apparatus shown in FIG. 13 with the S/P conversion section 304, multiplexing section 306, separation section 320 and P/S conversion section 322 removed and an addition section 702 added. In FIG. 15, the internal configuration of the relay control signal processing section 102 is the same as that in FIG. 2, and is therefore omitted.

The addition section 702 multiplexes an OFDM signal with information signals multiplexed with a plurality of subcarriers and a CDM signal obtained by spreading a relay control signal using a predetermined spreading code on a same frequency band. Multiplexing the OFDM signal and CDM signal on the same frequency band eliminates the need to reserve different frequency bands for the information signal and relay control signal, and can thereby improve the spectrum utilization efficiency.

Figure 16:
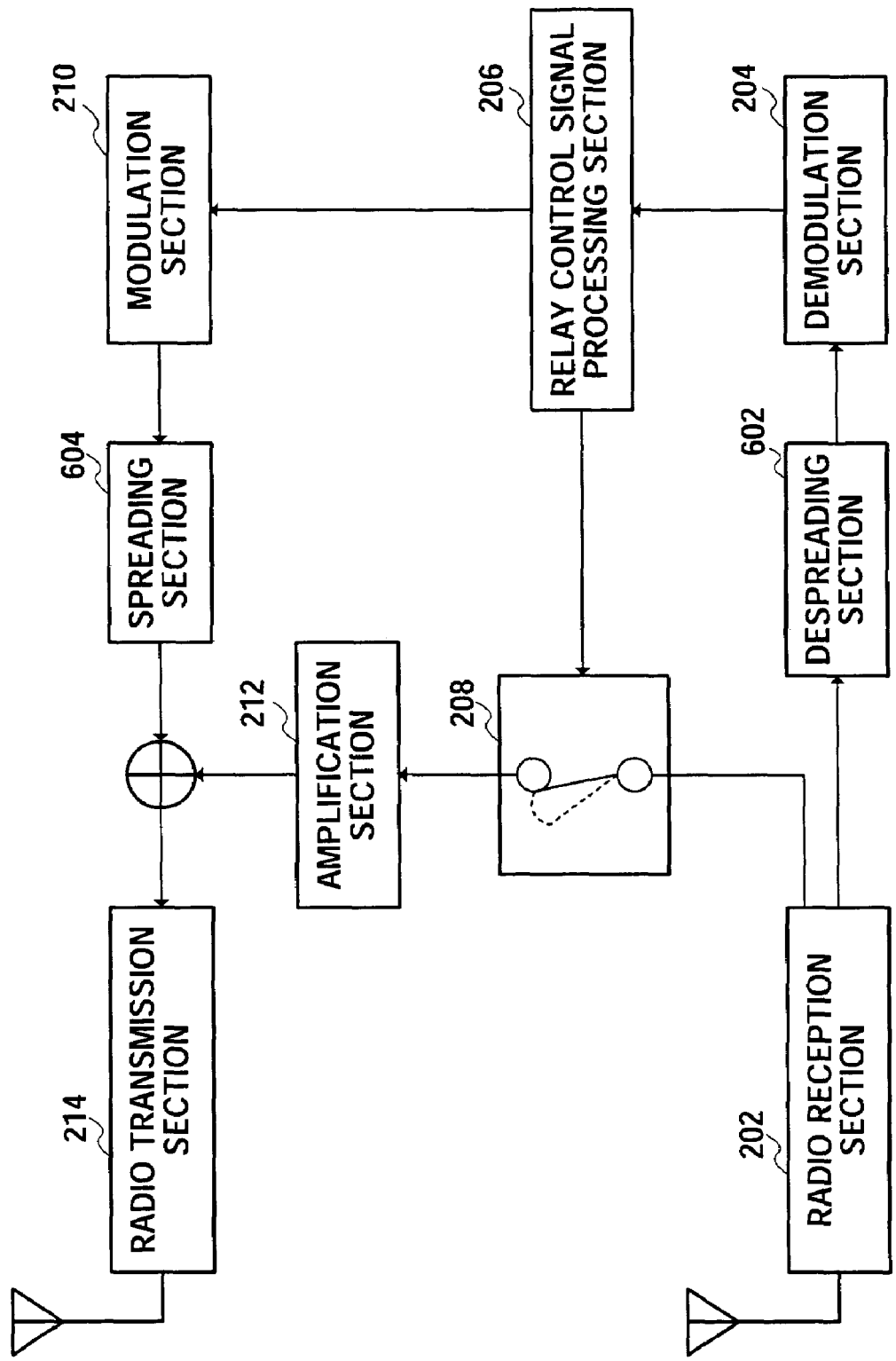
FIG. 16 is a block diagram showing a configuration of a relay apparatus according to Embodiment 5.

FIG. 16 is a block diagram showing a configuration of a relay apparatus according to Embodiment 5. In the same figure, the same parts as those in FIG. 3, FIG. 11 and FIG. 14 are assigned the same reference numerals and explanations thereof will be omitted. The relay apparatus shown in FIG. 16 has the configuration of the relay apparatus shown in FIG. 14 with a processing section related to OFDM-based modulation/demodulation, that is, the GI removal section 402, S/P conversion section 404, FFT section 406, separation section 408, P/S conversion section 410, S/P conversion section 412, multiplexing section 414, IFFT section 416, P/S conversion section 418, GI addition section 420 and timing adjustment section 422 removed. In FIG. 16, the internal configuration of the relay control signal processing section 206 is the same as that in FIG. 3, and is therefore omitted.

Figure 17:
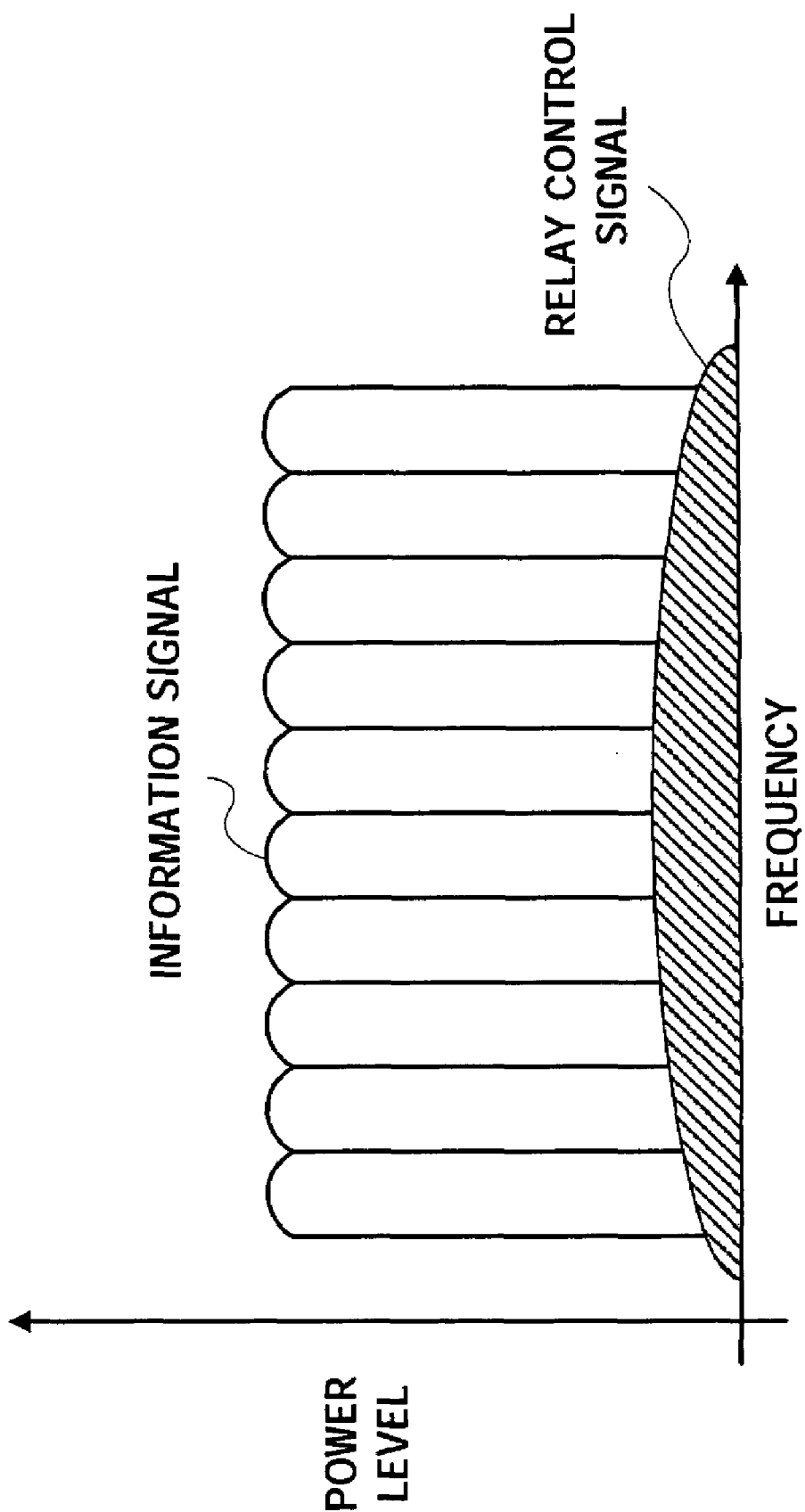
FIG. 17 illustrates an example of a frequency band according to Embodiment 5.

According to this embodiment, an information signal is OFDM-modulated, superimposed on a plurality of subcarriers, while a relay control signal is spread using a predetermined spreading code and the OFDM signal and CDM signal obtained are multiplexed on a same frequency band. For this reason, as shown in FIG. 17, the power level in various frequency bands is much smaller for relay control signals than for information signals. Therefore, it is possible to suppress interference of the relay control signals with the information signals.

Here, the spreading factor required for a spreading code for spreading a relay control signal varies depending on the number of subcarriers on which information signals are superimposed, power ratio of a CDM signal to an OFDM signal and allowable modulation error ratio (MER) of the CDM signal to the OFDM-signal, etc. For example, if the number of subcarriers is 768, power ratio is 1/768 and modulation error ratio is 30 dB, the relay control signal needs to be spread approximately 100 times.

Furthermore, unlike Embodiment 3 and Embodiment 4 in which relay control signals are superimposed on any one subcarrier, it is possible to use frequencies of all bands for transmission of information signals, and therefore the transmission efficiency of information signals is not reduced by transmission of relay control signals.

Thus, according to this embodiment, information signals are superimposed on a plurality of subcarriers into an OFDM signal, while relay control signals are spread using a predetermined spreading code into a CDM signal, the OFDM signal and CDM signal obtained are multiplexed in the same frequency band, and therefore it is possible to use frequencies of all bands for transmission of information signals, prevent the transmission efficiency of information signals from reducing due to transmission of relay control signals, make the power level of a relay control signal through spreading much smaller than the power level of information signals and suppress interference of relay control signals with information signals.

Embodiment 6

A feature of Embodiment 6 of the present invention is to transmit/receive OFDM signal and CDM signal which have been obtained in the same way as Embodiment 5 and time-division multiplexed.

Figure 18:
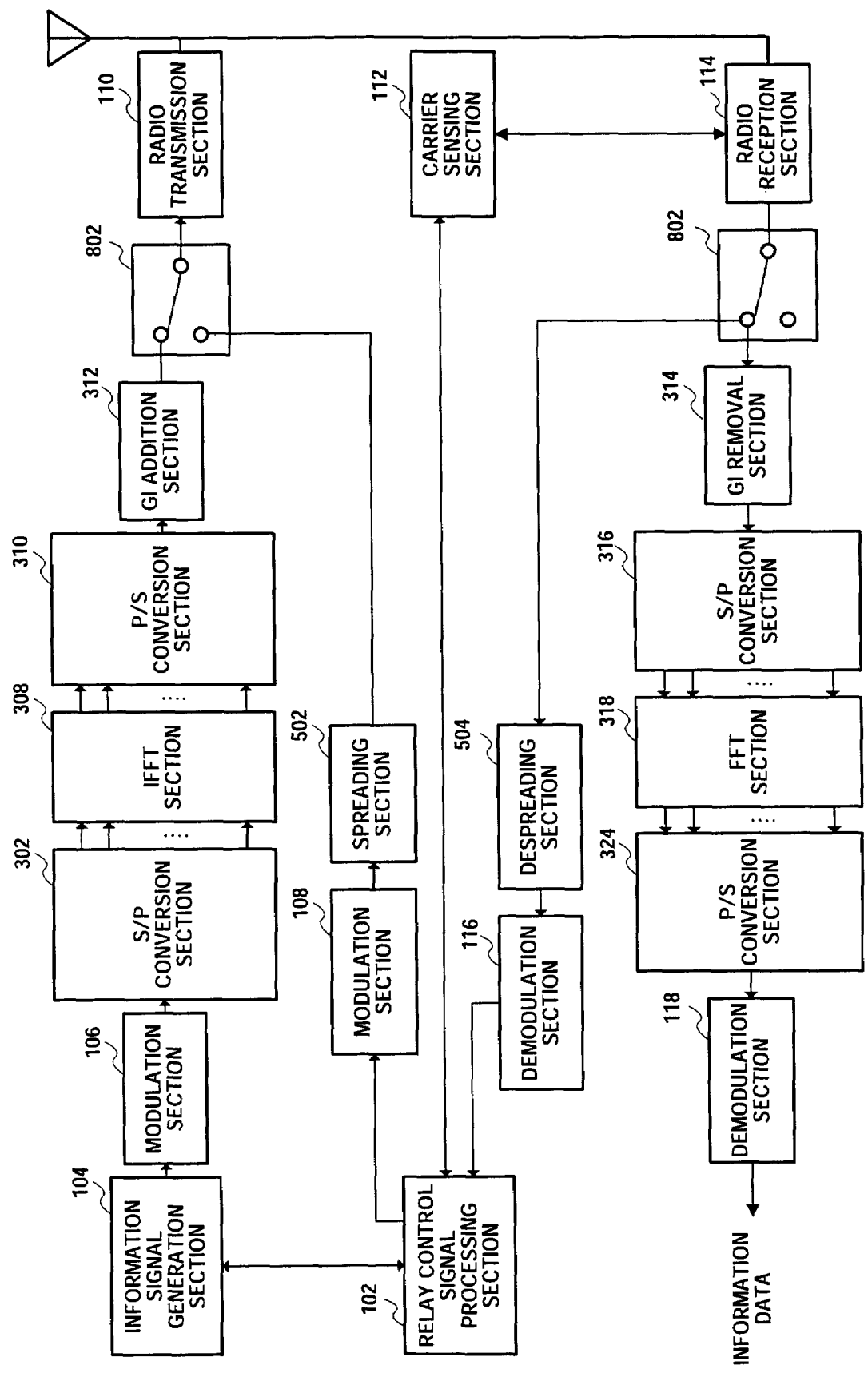
FIG. 18 is block diagram showing a configuration of a terminal apparatus according to Embodiment 6 of the present invention.

FIG. 18 is a block diagram showing a configuration of a terminal apparatus according to Embodiment 6 of the present invention. In the same figure, the same parts as those in FIG. 2, FIG. 10, FIG. 13 and FIG. 15 are assigned the same reference numerals and explanations thereof will be omitted. The terminal apparatus shown in FIG. 18 has a configuration with the addition section 702 of the terminal apparatus shown in FIG. 15 replaced by a switch 802 and with a switch 804 added. In FIG. 18, the internal configuration of the relay control signal processing section 102 is the same as that in FIG. 2, and is therefore omitted.

The switch 802 changes every predetermined time and outputs information signals which have become OFDM signals and relay control signals which have become CDM signals on a time-division basis. Here, the time at which the switch 802 is switched may be fixed or variable. When the switch 802 is switched at fixed intervals, switching control can be realized with a simple circuit configuration, which realizes miniaturization of the circuit. On the other hand, when the switching cycle of the switch 802 is made variable, it is possible to switch transmission in an optimum cycle according to the situation using parameters such as a data amount of information signals, situation of the radio transmission path or required QoS (Quality of Service).

The switch 804 synchronizes with a received signal, outputs a relay control signal to a despreading section 504 and outputs an information signal to a GI removal section 314.

Figure 19:
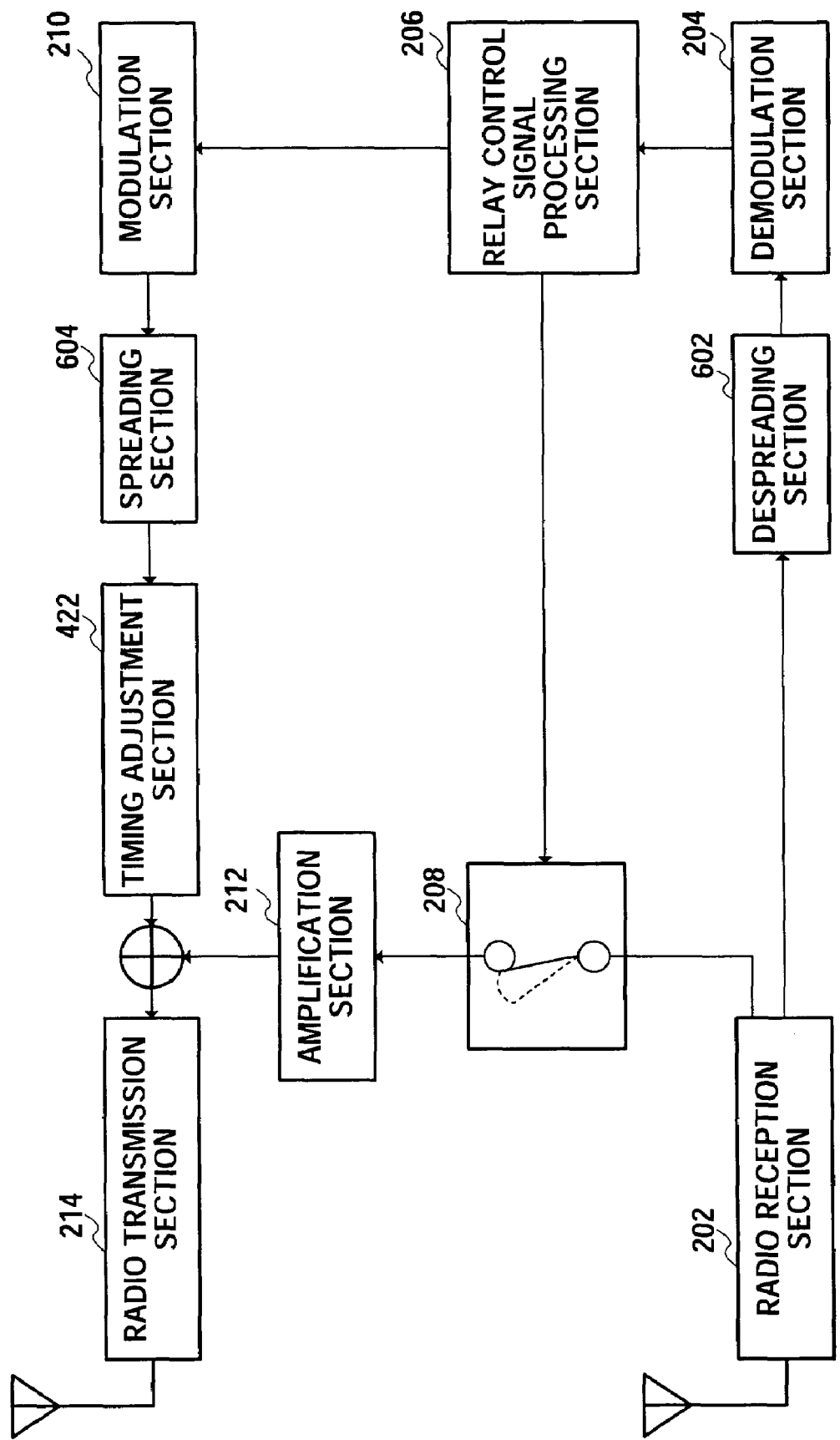
FIG. 19 is a block diagram showing a configuration of a relay apparatus according to Embodiment 6.

FIG. 19 is a block diagram showing a configuration of a relay apparatus according to Embodiment 6. In the same figure, the same parts as those in FIG. 3, FIG. 11, FIG. 14 and FIG. 16 are assigned the same reference numerals and explanations thereof will be omitted. The relay apparatus shown in FIG. 19 has the configuration of the relay apparatus shown in FIG. 16 with the timing adjustment section 422 shown in FIG. 11 added. In FIG. 19, the internal configuration of the relay control signal processing section 206 is the same as that in FIG. 3, and is therefore omitted.

As in the case of Embodiment 5, according to this embodiment, an information signal is OFDM-modulated, superimposed on a plurality of subcarriers, while a relay control signal is spread using a predetermined spreading code and the OFDM signal and CDM signal are obtained.

Unlike Embodiment 5, in this embodiment, the OFDM signal and CDM signal obtained at the terminal apparatus are switched by the switch 802, output, time-division multiplexed and transmitted.

At the relay apparatus as in the case of Embodiment 1 to Embodiment 5, the relay control signal processing section 206 carries out processing using relay control signals and newly generates relay control signals such as reception possibility inquiry signals or NG signals. The relay control signals generated are sent with timing thereof adjusted by a timing adjustment section 422. Timing adjustment by the timing adjustment section 422 is realized in such a way that a relay control signal is output while no information signal is output from the amplification section 212. Therefore, the relay apparatus transmits a relay control signal at a timing at which information signals are not transmitted.

This causes information signals and relay control signals to be transmitted at different times and it is possible to further suppress interference of relay control signals with information signals compared to Embodiment 5.

In this way, according to this embodiment, information signals are superimposed on a plurality of subcarriers into an OFDM signal, while relay control signals are spread using predetermined spreading codes into CDM signals and the OFDM signals and CDM signals obtained are time-division multiplexed and sent, and therefore it is possible to prevent the efficiency of transmission of information signals from reducing due to transmission of relay control signals using frequencies of all bands for transmission of information signals and further suppress interference of relay control signals with information signals by transmitting information signals and relay control signals at different times.

Embodiment 5 and Embodiment 6 adopt a direct spreading scheme as the spreading scheme, but a frequency hopping scheme may also be used. Furthermore, the modulation scheme used for information signals and relay control signals are not limited to the above described modulation scheme.

Embodiment 7

A feature of Embodiment 7 is to make a gain variable so that output power of an information signal relayed by a relay apparatus becomes constant and amplify the information signal.

Figure 20:
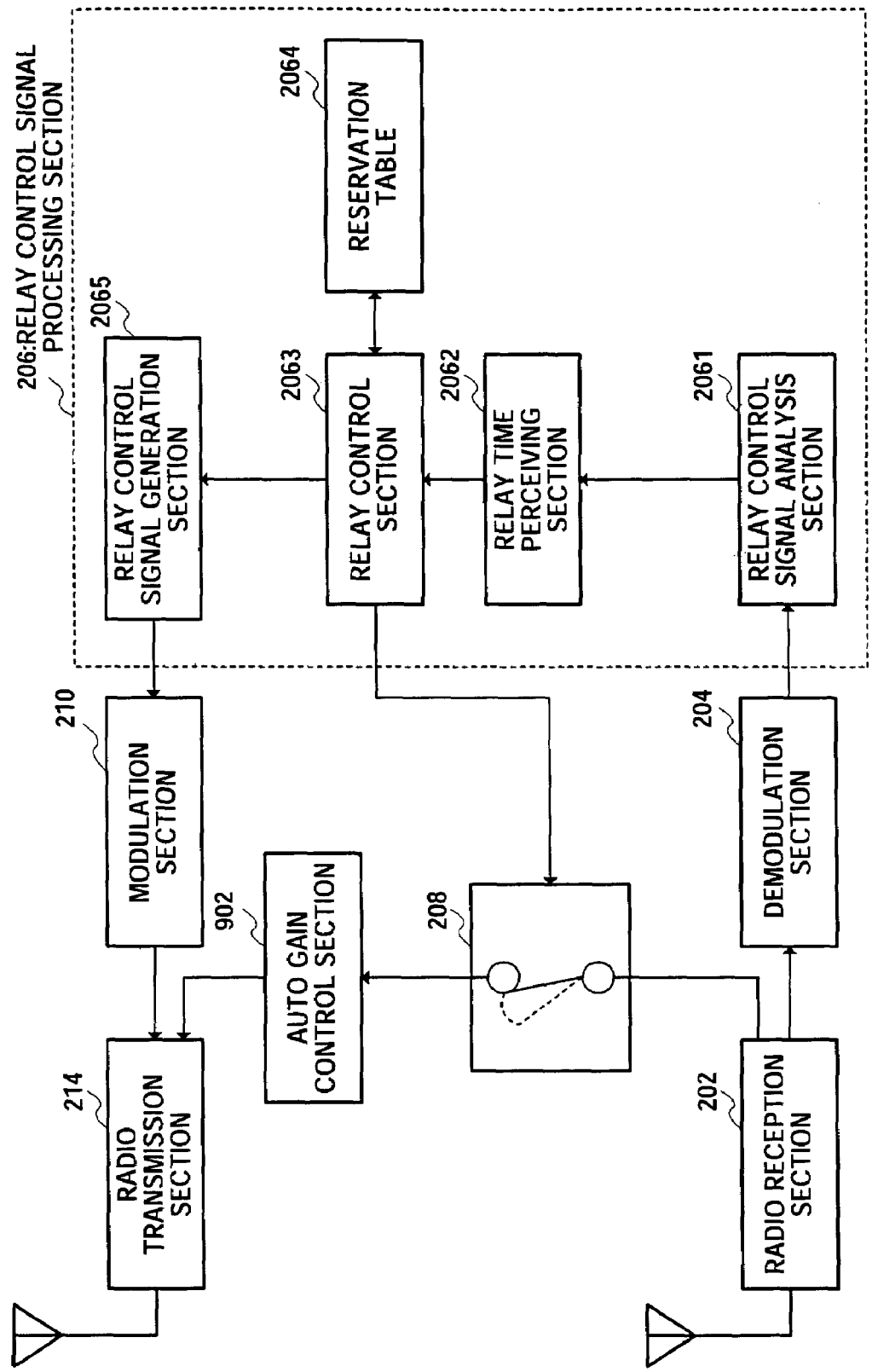
FIG. 20 is a block diagram showing a configuration of a relay apparatus according to Embodiment 7 of the present invention.

FIG. 20 is a block diagram showing a configuration of a relay apparatus according to Embodiment 7 of the present invention. In the same figure, the same parts as those in FIG. 3 are assigned the same reference numerals and explanations thereof will be omitted. The relay apparatus shown in FIG. 20 has the configuration of the relay apparatus 200 shown in FIG. 3 with an auto gain control section 902 added.

The auto gain control section 902 measures input power of an information signal input while a switch 208 is connected and changes the gain so that output power becomes constant. It is also possible to arrange a squelch detection section for controlling noise generated during relay operation of information signals in the auto gain control section 902. When the squelch detection section is disposed, if input power is equal to or less than a predetermined power level, it is possible not to allow any signals to be output when input power thereof is equal to or lower than a predetermined power level or prevent signals at signal levels that should not be relayed at the same frequency from being amplified and transmitted and prevent interference with other apparatuses.

As in the case of Embodiment 1 to Embodiment 6, this embodiment performs processing using a relay control signal processing section (not shown) of the terminal apparatus and a relay control signal processing section 206 of the relay apparatus. For this reason, the path for relaying information signals is reserved and when information signals are relayed, the relay apparatus performs transmission and reception of information signals simultaneously. In such a case, an echo wave is generally produced whereby a signal sent from the relay apparatus is received by the relay apparatus again and the relay apparatus may oscillate abnormally and damage the apparatus. Therefore, this embodiment fixes output power from the auto gain control section 902 to prevent abnormal oscillation by the echo wave.

Thus, this embodiment keeps output power of information signals constant by controlling gains, and can thereby prevent abnormal oscillation by the echo wave when signals are not stored in the relay apparatus and relayed at the same frequency and prevent the reception level at the relay apparatus from increasing extremely and thus prevent the apparatus from being destroyed, allowing stable operation of a communication network system.

Embodiment 8

A feature of Embodiment 8 is to subtract a replica signal corresponding to an echo wave from a received signal beforehand and carry out echo cancellation at a relay apparatus.

Figure 21:
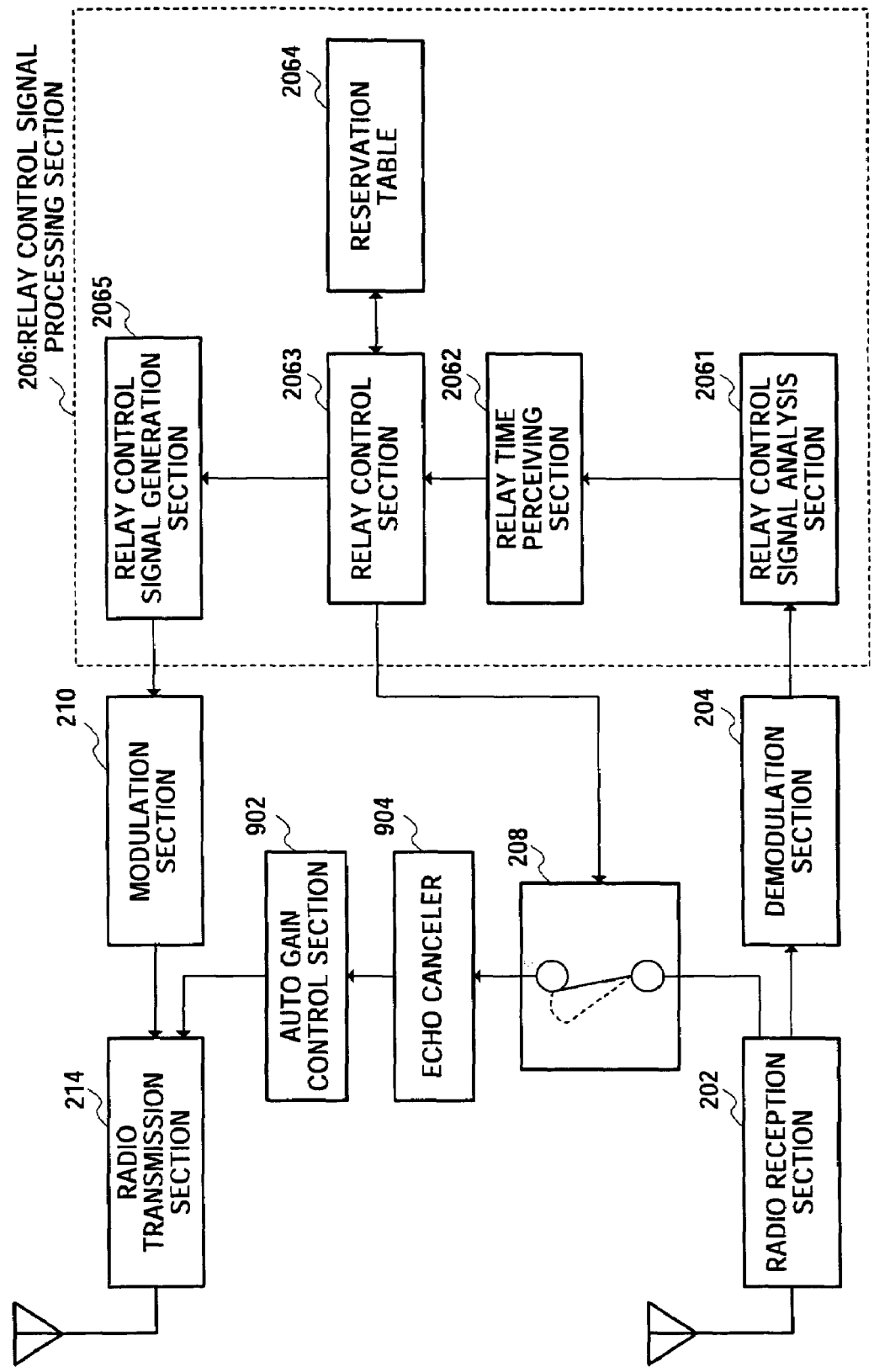
FIG. 21 is a block diagram showing a configuration of a relay apparatus according to Embodiment 8 of the present invention.

FIG. 21 is a block diagram showing a configuration of a relay apparatus according to Embodiment 8 of the present invention. In the same figure, the same parts as those in FIG. 3 and FIG. 20 are assigned the same reference numerals and explanations thereof will be omitted. The relay apparatus shown in FIG. 21 has the configuration of the relay apparatus shown in FIG. 20 with an echo canceller 904 added.

The echo canceller 904 subtracts the replica signal which is equivalent to echo wave from the received signal. Here, if it is possible to arrange the transmission antenna and reception antenna apart from each other with sufficient space and sufficiently reduce an amount of coupling between transmission/reception antennas, influences of the echo wave are small though there is no echo canceller 904.

However, when transmission/reception antennas are arranged sufficiently apart from each other, it is difficult to reduce the size of the apparatus. Furthermore, when reception power of the information signal to be relayed fluctuates and becomes extremely small, the ratio of the power of the information signal to be relayed to the power of the echo wave is inverted at the end of the reception antenna, producing abnormal oscillation of the relay apparatus as a result. The echo canceller 904 plays an important role in preventing such an event and reducing quality degradation of relay caused by the echo wave.

An internal configuration example of the echo canceller 904 will be explained more specifically below using five configuration examples.

Figure 22:
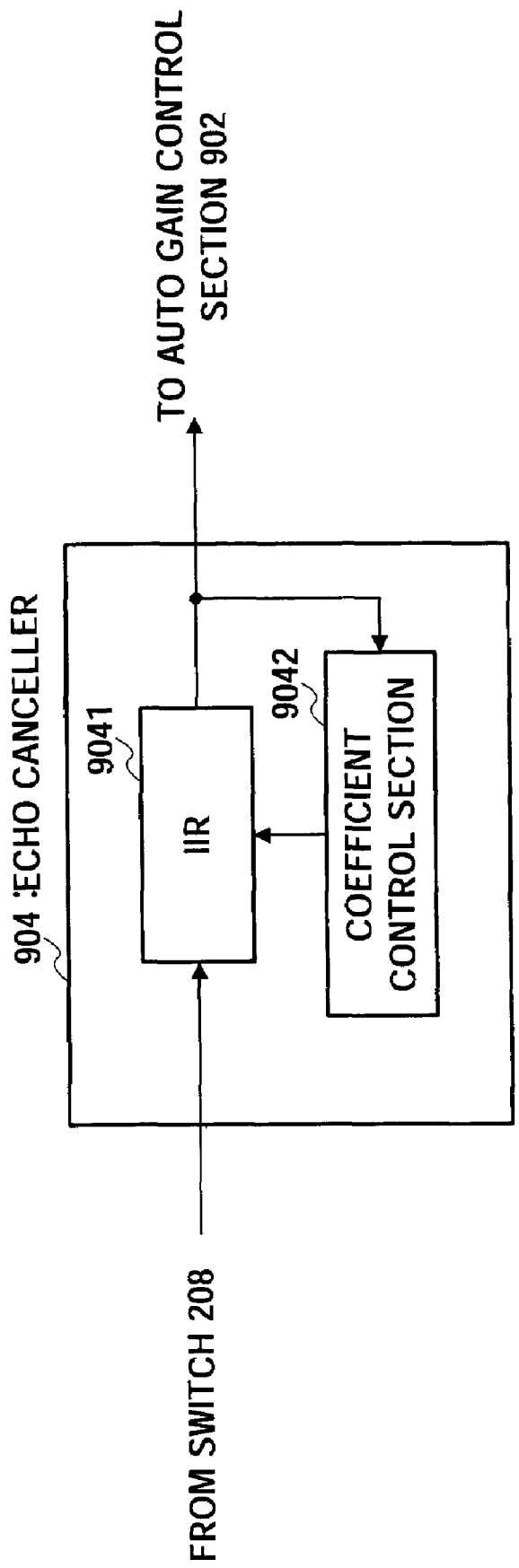
FIG. 22 is a block diagram of a first configuration example of an echo canceller according to Embodiment 8.

(1) FIG. 22 is a block diagram showing a first configuration example of an echo canceller 904. The echo canceller 904 shown in the same figure is provided with an IIR (Infinite-duration Impulse Response) filter 9041 that removes a replica signal from of a echo wave from a signal output from a switch 208 and a coefficient control section 9042 that controls a filter coefficient of the IIR filter 9041.

In the echo canceller 904 shown in FIG. 22, the coefficient control section 9042 calculates an estimated value of the characteristic of a transmission path from the transmission antenna to the reception antenna and sets this estimated value as a filter coefficient of the IIR filter 9041. The IIR filter 9041 removes the replica signal of the echo wave from the transmission antenna to the reception antenna and carries out feedback control.

Figure 23:
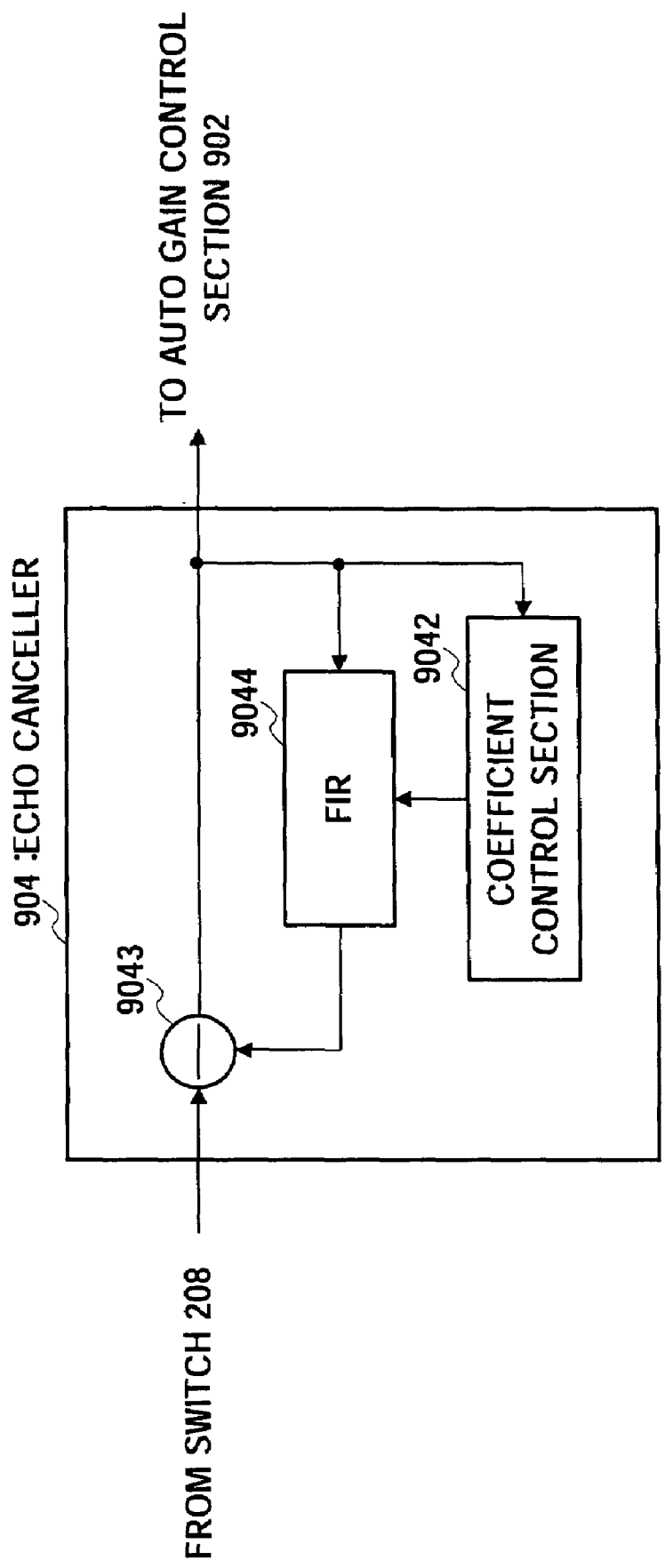
FIG. 23 is a block diagram of a second configuration example of the echo canceller according to Embodiment 8.

(2) FIG. 23 is a block diagram showing a second configuration example of the echo canceller 904. The echo canceller 904 shown in the same figure is provided with a coefficient control section 9042, subtractor 9043 and an FIR (Finite-duration Impulse Response) filter 9044.

In the echo canceller 904 shown in FIG. 23, the coefficient control section 9042 controls a filter coefficient of the FIR filter 9044. Then, the FIR filter 9044 generates a replica signal of the echo wave and the subtractor 9043 subtracts the replica signal of the echo wave from the signal output from the switch 208. That is, the subtractor 9043 and FIR filter 9044 in FIG. 23 performs the same operation as the IIR filter 9041 in FIG. 22. In this echo canceller 904, a signal input to the coefficient control section 9042 always results from cancellation of the echo wave component and is a signal including only a cancellation error. Therefore, updating the coefficient so that the cancellation error converges to 0 makes it possible to further improve the accuracy of the echo cancellation operation.

Figure 24:
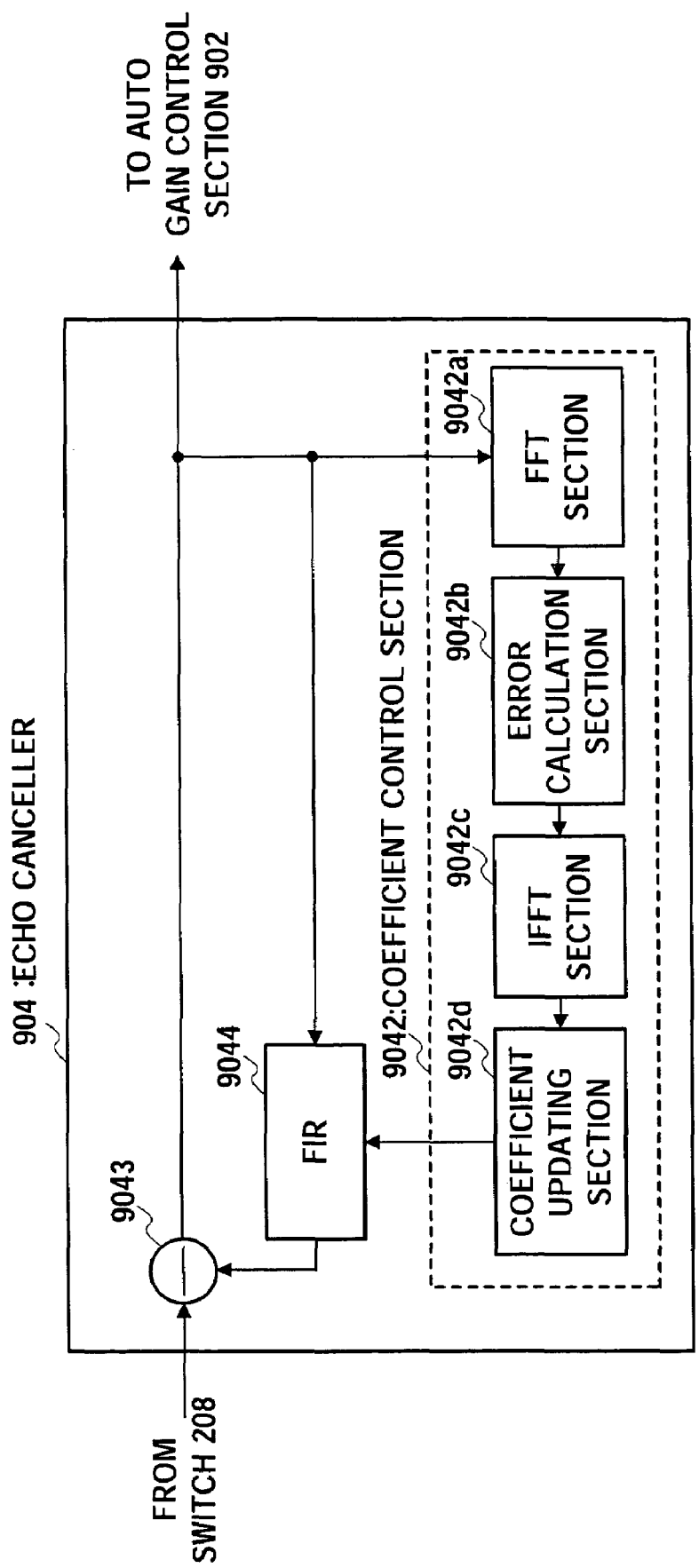
FIG. 24 is a block diagram of a third configuration example of the echo canceller according to Embodiment 8.

(3) FIG. 24 is a block diagram showing a third configuration example of the echo canceller 904. The echo canceller 904 shown in the same figure is intended to remove the echo wave when an information signal to be relayed is modulated according to an OFDM scheme and shows a more specific configuration of the coefficient control section 9042 shown in FIG. 23. The coefficient control section 9042 shown in FIG. 24 is provided with an FFT section 9042*a*, an error calculation section 9042*b*, an IFFT section 9042*c* and a coefficient updating section 9042*d*.

The echo canceller shown in FIG. 24, the signal with the replica signal of the echo wave subtracted by a subtractor 9043 is fast Fourier transformed by an FFT section 9042*a*. This causes a signal in the time domain input to the coefficient control section 9042 to be transformed into a signal in the frequency domain.

Here, as described above, the signal input to the coefficient control section 9042 is one with the echo wave component canceled and includes a cancellation error.

When a signal containing a cancellation error is transformed into a signal in the frequency domain by the FFT section 9042*a* and compared with an ideal frequency characteristic without containing any cancellation error by the error calculation section 9042*b* and the cancellation error is calculated.

Then, the calculated cancellation error is inverse fast Fourier transformed by the IFFT section 9042*c* into a time domain signal again and output to the coefficient updating section 9042*d*. The coefficient updating section 9042*d* decides a filter coefficient of the FIR filter 9044 based on the cancellation error. More specifically, the coefficient updating section 9042*d* accumulates past cancellation error components for each tap of the FIR filter 9044 and regards the accumulation result as the filter coefficient of the FIR filter 9044.

Repeating updating of such a filter coefficient converges the cancellation error to 0 and can generate a replica signal of the echo wave accurately. Since the radio transmission path between transmission/reception antennas is constantly fluctuating, it is desirable to frequently update the filter coefficient of the FIR filter 9044 so as to follow up the fluctuation of the radio transmission path.

Thus, when the information signal is an OFDM signal, it is possible to implement a high accuracy echo canceller with a relatively small circuit scale by calculating a cancellation error in the frequency domain and causing this cancellation error to converge to 0.

Unlike broadcasting whereby signals are continuously relayed, signals are relayed in a burst-like manner on a radio communication network. For this reason, the coefficient updating section 9042*d* stores the filter coefficient of the FIR filter 9044 calculated during the previous relay and sets the stored filter coefficient in the FIR filter 9044 at the time of starting the next relay operation and can thereby shorten the time until the cancellation error converges.

Figure 25:
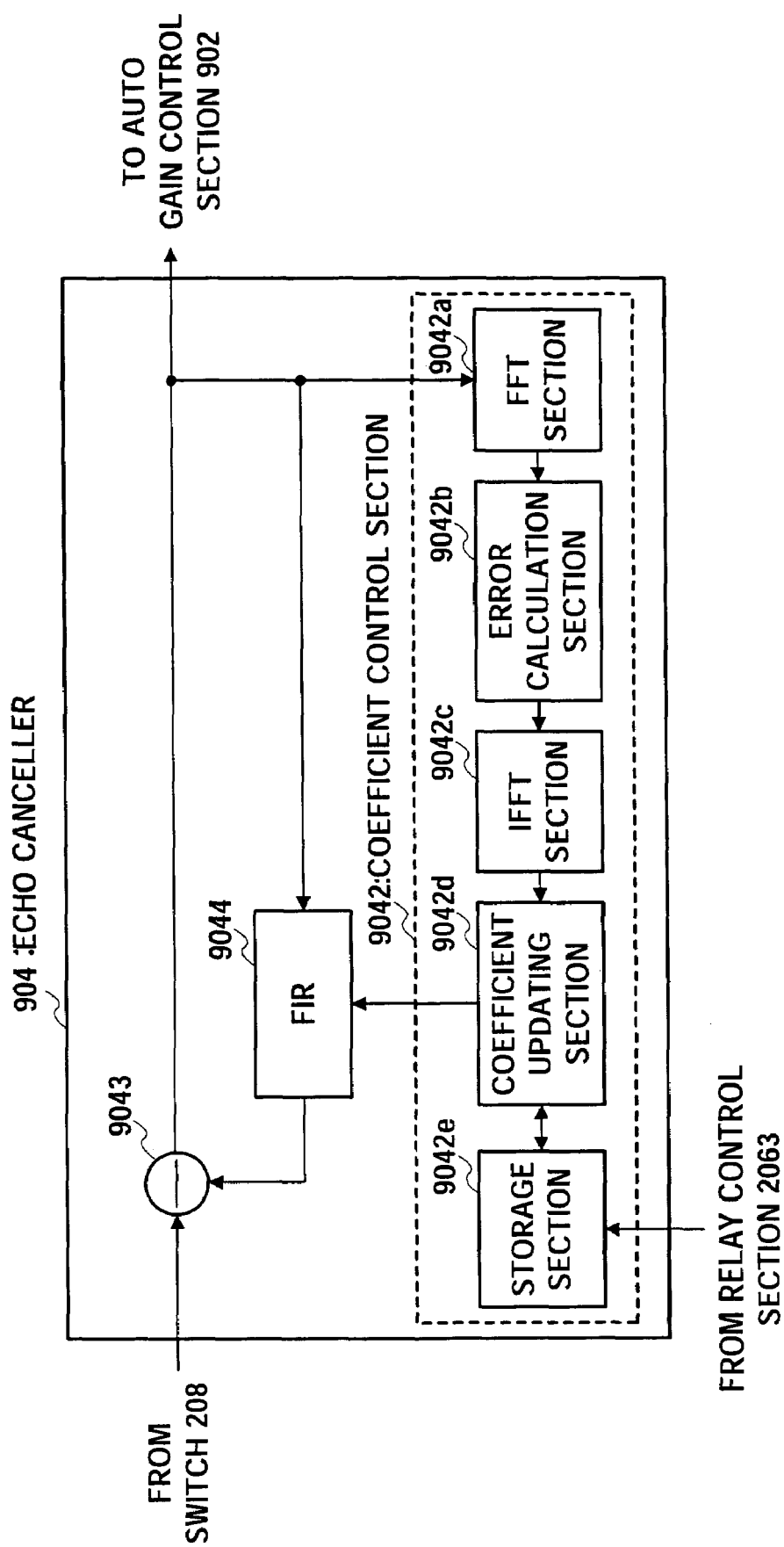
FIG. 25 is a block diagram of a fourth configuration example of the echo canceller according to Embodiment 8.

(4) FIG. 25 is a block diagram showing a fourth configuration example of the echo canceller 904. The echo canceller 904 shown in the figure has the configuration of the echo canceller 904 shown in FIG. 24 with a storage section 9042*e* added. Since the rest of the configuration is the same as that of the echo canceller 904 shown in FIG. 24, explanations thereof will be omitted.

The storage section 9042*e* acquires information from the relay control section 2063 and stores the information in association with the combinations of transmission source terminal apparatuses and destination terminal apparatuses of signals during past relay operations and the filter coefficients calculated by the coefficient updating section 9042*d*.

In the echo canceller 904 shown in FIG. 25, if the combination of the transmission source terminal apparatus and destination terminal apparatus of the signal to be relayed this time is the same as that during a past relay operation, a filter coefficient of the FIR filter 9044 calculated during the past relay operation is output from the storage section 9042*e* to the coefficient updating section 9042*d* and designated as an initial value for updating coefficients by the coefficient updating section 9042*d*.

In this way, it is possible to shorten the time after a relay operation is started until the cancellation error converges, reduce quality degradation of signals by relay and realize high accuracy relay.

Figure 26:
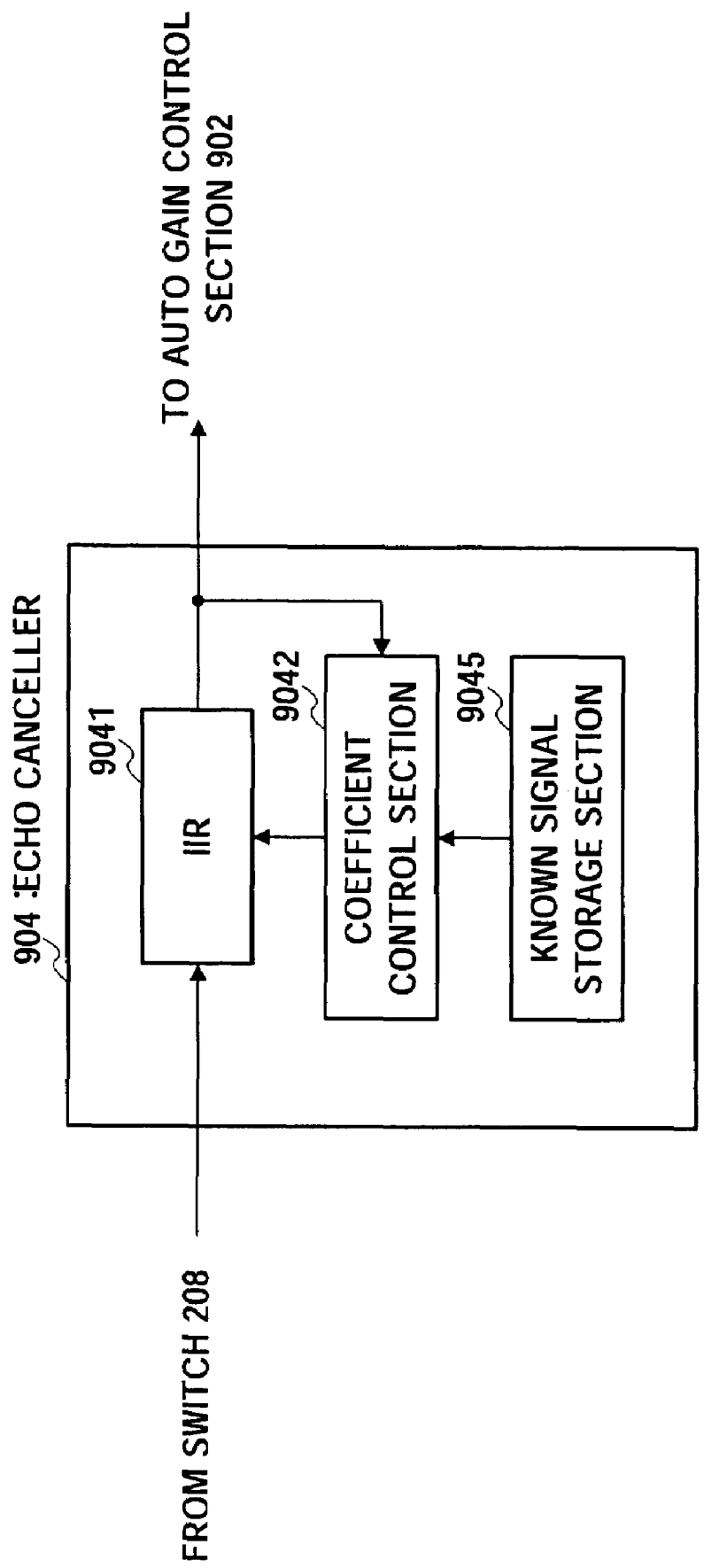
FIG. 26 is a block diagram of a fifth configuration example of the echo canceller according to Embodiment 8.

(5) FIG. 26 is a block diagram showing a fifth configuration example of the echo canceller 904. The echo canceller 904 shown in the same figure is intended to remove an echo wave when a known signal for a filter coefficient setting is added to the start of the information signal to be relayed, and has the configuration of the echo canceller 904 shown in FIG. 22 with a known signal storage section 9045 added.

The known signal storage section 9045 stores known signals for filter coefficient settings added to the start of the information signal to be relayed.

In the echo canceller 904 shown in FIG. 26, the coefficient control section 9042 calculates an error between the start of the information signal which has passed through the IIR filter 9041 and a known signal stored in the known signal storage section 9045 and calculates a filter coefficient which reduces this error.

The known signal stored in the known signal storage section 9045 may be the same signal that is added to the start of the information signal or a signal obtained by transforming this signal into a signal in the frequency domain. When the echo canceller 904 shown in FIG. 24 and FIG. 25 calculates an error using a known signal in the frequency domain, the known signal stored in the known signal storage section 9045 is also preferably a signal in the frequency domain.

In this way, by deciding a filter coefficient using a known signal, it is possible to decide a filter coefficient according to the situation of the transmission path in a short time even when the condition of the transmission path drastically fluctuates and start relay of the information signal after canceling the echo wave sufficiently.

As shown above, this embodiment subtracts the replica signal of the echo wave from the information signal to be relayed beforehand and then relays the information signal, and can thereby reduce influences of the echo wave and arrange transmission/reception antennas at short distances from one another and reduce the size of the apparatus consequently.

Embodiment 9

A feature of Embodiment 9 of the present invention is to control an amplification gain with which an information signal to be relayed is amplified according to the quality of this information signal.

Figure 27:
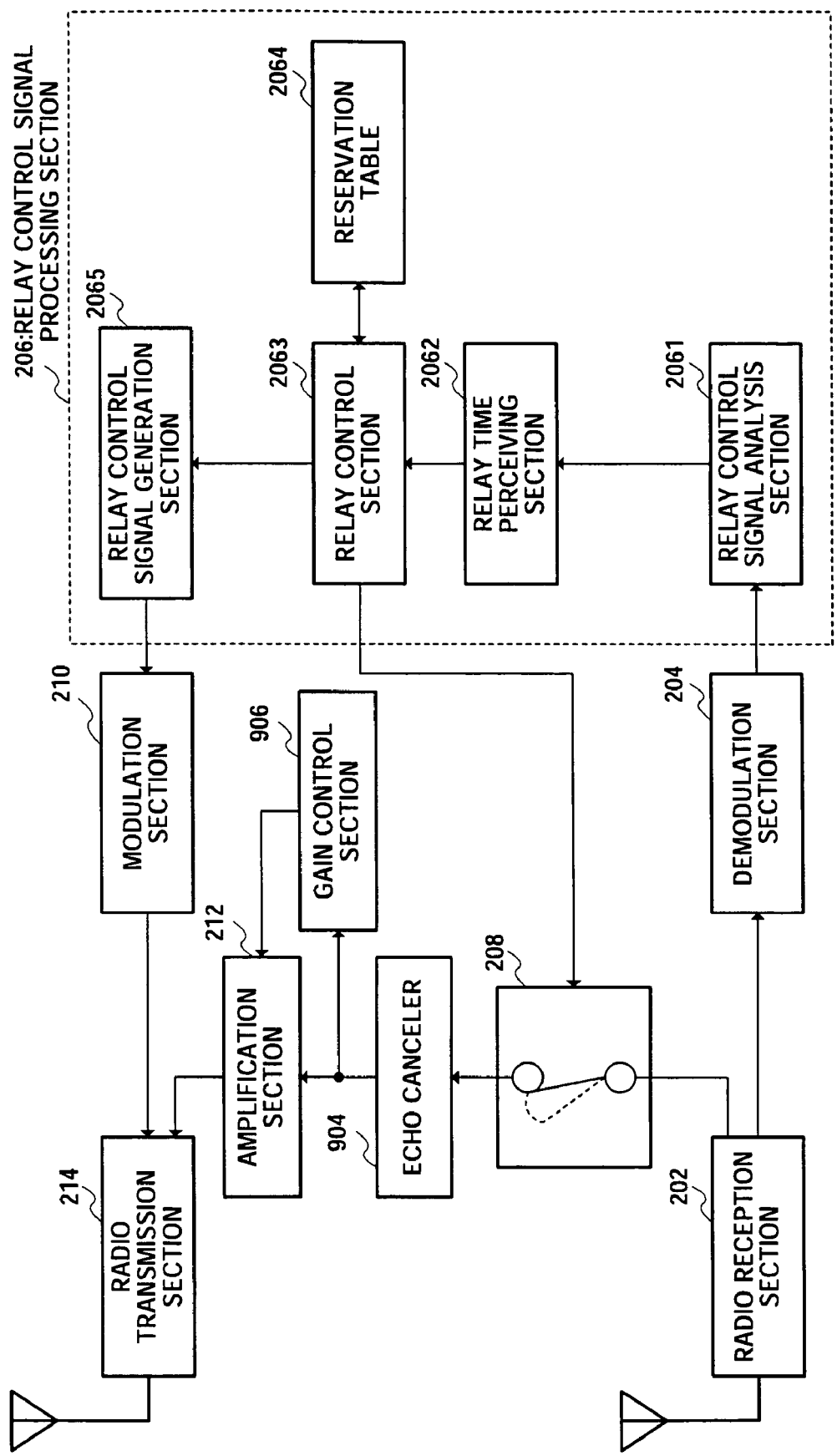
FIG. 27 is a block diagram of a relay apparatus according to Embodiment 9 of the present invention.

FIG. 27 is a block diagram showing a configuration of a relay apparatus according to Embodiment 9 of the present invention. In the same figure, the same parts as those in FIG. 3 and FIG. 21 are assigned the same reference numerals and explanations thereof will be omitted. The relay apparatus shown in FIG. 27 has the configuration of the relay apparatus shown in FIG. 3 with an echo canceller 904 and a gain control section 906 added.

The gain control section 906 monitors the signal quality of an information signal to be relayed, controls the gain of an amplification section 212 according to the signal quality to thereby control transmit power of the information signal to be relayed. More specifically, the gain control section 906 monitors, for example, D/U (Desire/Undesire: desired signal to undesired signal) ratio, S/N (Signal/Noise: signal to noise) ratio and modulation error ratio (MER) as signal quality and performs control such that transmit power is reduced when the signal quality is poor.

This prevents the D/U ratio at the input end to the gain control section 906 from becoming negative due to an echo wave which returns to the reception antenna from the transmission antenna of the relay apparatus and prevents quality degradation of the information signal to be relayed. Furthermore, when the S/N ratio as the signal quality is poor, it is possible to prevent waste of spectrums by stopping relay of information signals.

Thus, this embodiment controls transmit power of information signals to be relayed according to signal quality, and can thereby prevent quality degradation of the information signals relayed, prevent waste of spectrums and improve the spectrum utilization efficiency.

Figure 28:
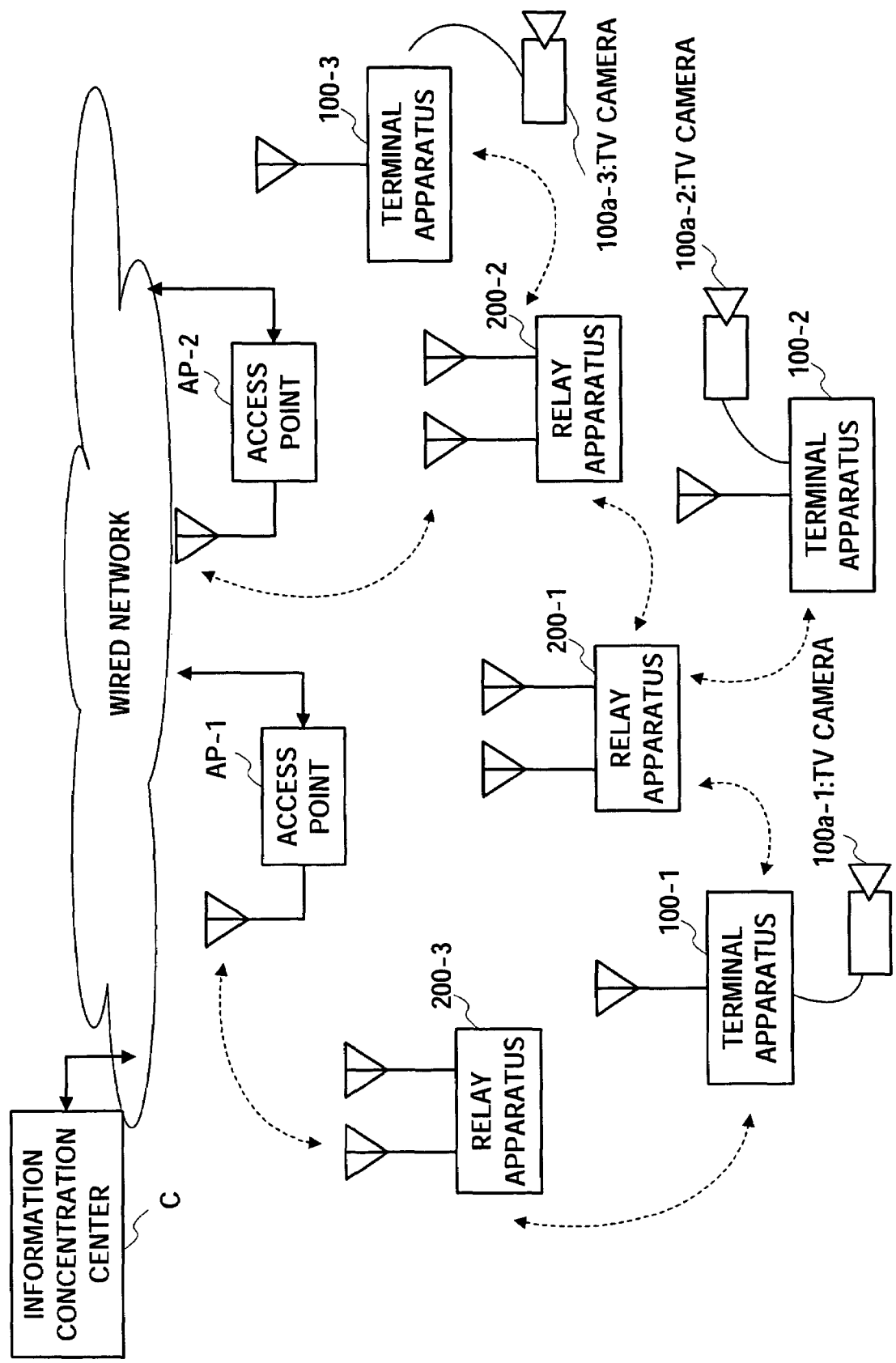
FIG. 28 is a schematic diagram showing an example of a local disaster prevention radio system according to an embodiment of the present invention.

FIG. 28 is a schematic diagram showing an example of a case where the terminal apparatus and relay apparatus of the foregoing embodiments are arranged on a network of a local disaster prevention radio system.

In this local disaster prevention radio system, an information concentration center C is connected to a wired network and an access point AP-1 and an access point AP-2 are connected to this wired network. Terminal apparatuses 100-1 to 100-3 access the access point AP-1 and access point AP-2 directly or via relay apparatuses 200-1 to 200-3.

Furthermore, TV cameras 100a-1 to 100a-3 are connected to the terminal apparatuses 100-1 to 100-3 respectively and information such as images acquired by the TV cameras 100a-1 to 100a-3 is transmitted as an information signal from the terminal apparatuses 100-1 to 100-3 to the information concentration center C via the relay apparatuses 200-1 to 200-3, access point AP-1 and access point AP-2 and wired network.

Constructing the local disaster prevention radio system in such a configuration makes it possible to concentrate various types of information collected by the terminal apparatuses 100-1 to 100-3 on an information concentration center C and keep track of the situation of an area where a disaster occurs.

In the event of a disaster, even if a wired network is cut and wired communication is disabled, using this local disaster prevention radio system makes it easier to collect information over a wide range. That is, it is possible to install a plurality of relay apparatuses 200-1 to 200-3 in a disaster area, transport the terminal apparatuses 100-1 to 100-3 communicable by radio with these relay apparatuses 200-1 to 200-3 to their respective points, connect the TV cameras 100a-1 to 100a-3, etc., to the terminal apparatuses 100-1 to 100-3 and transmit images taken by the TV cameras 100a-1 to 100a-3 to the information concentration center C.

An image taken by a TV camera, etc., is generally a high-speed, wideband signal, and therefore it is essential to reserve a wideband radio channel to collect images at a plurality of points. According to the present invention, a radio channel is reserved by a relay control signal and then the information signal is relayed using the same frequency, and therefore a high-speed, wideband signal can be efficiently transmitted. Furthermore, by improving the spectrum utilization efficiency using an OFDM scheme or OFCDM scheme, it is possible to connect to a wired network such as the Internet at many terminal apparatuses and it is easy to share or transmit information in the disaster area.

The present invention is not only applicable to an emergency local disaster prevention radio system in the event of a disaster but also widely applicable to a radio communication network which covers a normal wide range area.

As described above, when relay is carried out at the same frequency on a radio communication network on which bidirectional communication is performed, the present invention can reduce the scale of the apparatus and relay signals without switching between transmission and reception and by reducing waste of time.

A relay apparatus according to a first mode of the present invention is a relay apparatus for relaying information signals transmitted by radio at the same frequency, comprising a reception section that receives a relay control signal which notifies a relay time for relaying the information signal prior to the information signal and a relay section that relays the information signal during the relay time notified by the relay control signal.

According to this configuration, the information signal is relayed during the relay time notified by the relay control signal, and it is thereby possible to reserve a transmission path for the information signal during a relay time beforehand and the information signal need not be stored. Therefore, when relay is performed at the same frequency on a radio communication network on which bidirectional communication is performed, it is possible to relay signals with the scale of the apparatus reduced, without temporally switching between transmission and reception and with waste of time reduced.

A relay apparatus according to a second mode of the present invention is the above described first mode, further comprising a decision section that decides whether a relay operation on an information signal is possible or not within the relay time notified by the relay control signal, wherein, when the decision result by the decision section shows that the relay operation is possible, the relay section relays the information signal during the relay time.

According to this configuration, when an information signal is relayed, the transmission path is reserved beforehand, and therefore the information signal need not be stored in the relay apparatus. Therefore, when relay is performed at the same frequency on a radio communication network on which bidirectional communication is performed, it is possible to relay signals with the scale of the apparatus reduced, without temporally switching between transmission and reception and with waste of time reduced. That is, it is possible to effectively prevent the spectrum utilization efficiency from reducing by relay.

A relay apparatus according to a third mode of the present invention is the above described second mode, wherein the reception section receives a relay possibility inquiry signal for inquiring whether relay of an information signal is possible or not as a relay control signal, the decision section decides, when relay of information signals other than the information signal during a relay time notified by the relay possibility inquiry signal is not scheduled and the relay destination of the information signal is not scheduled to receive any information signal other than the information signal, that the relay operation of the information signal is possible during the relay time.

According to this configuration, when, for example, an information signal is transmitted from a terminal apparatus, etc., the relay apparatus and the relay destination of the information signal are ready to relay/receive the information signal respectively, and when the information signal need not be stored in the relay apparatus and relay is performed at the same frequency on a radio communication network on which bidirectional communication is performed, it is possible to relay signals with the scale of the apparatus reduced, without temporally switching between transmission and reception and with waste of time reduced.

A relay apparatus according to a fourth mode of the present invention is the above described third mode, wherein the decision section includes a reservation table that stores the relay time notified by the relay possibility inquiry signal in association with the possibility of relay operation during the relay time and decides whether other information signals are scheduled to be relayed or not during a newly notified relay time with reference to the reservation table.

According to this configuration, when the relay possibility inquiry signal is received, it is possible to quickly and accurately decide whether the relay apparatus can perform relay or not.

A relay apparatus according to a fifth mode is the above described third mode, wherein the decision section decides whether the other information signal is scheduled to be received or not according to a relay control signal indicating the possibility of reception transmitted from the relay destination of the information signal.

According to this configuration, it is possible to accurately decide whether the relay destination of the information signal can receive the information signal at a desired relay time or not.

A relay apparatus according to a sixth mode of the present invention is the above described first mode, wherein the reception section receives a relay control signal assigned a frequency band which is different from that of the information signal and is a frequency band narrower than the frequency band assigned to the information signal.

According to this configuration, since a narrow frequency band is assigned to a relay control signal whose amount of information is smaller than that of information signals such as speech and data, it is possible to improve the spectrum utilization efficiency, transmit information signals and relay control signals in different frequency bands and thereby reduce interference between signals.

A relay apparatus according to a seventh mode of the present invention is the above described first mode, wherein the reception section receives an OFDM signal with a relay control signal superimposed on a specific subcarrier of a plurality of subcarriers and the relay section relays the information signals superimposed on the subcarriers other than the specific subcarrier.

According to this configuration, it is not necessary to reserve different frequency bands for relay control signals and information signals and it is possible to improve the spectrum utilization efficiency and remove influences of frequency selective fading through OFDM-based transmission and accurately reserve the path necessary to relay information signals.

A relay apparatus according to an eighth mode of the present invention is the above described seventh mode, wherein the relay section includes a notch filter that attenuates only the specific subcarrier of the OFDM signal and relays the information signal obtained by attenuating the specific subcarrier.

According to this configuration, it is possible to effectively attenuate a relay control signal with a relatively small circuit and suppress interference through relay control signals in relaying information signals.

A relay apparatus according to a ninth mode of the present invention is the above described seventh mode, wherein the reception section receives an OFCDM signal with a relay control signal spread using a predetermined spreading code superimposed on the specific subcarrier.

According to this configuration, relay control signals are spread using a predetermined spreading code, and therefore it is possible to improve the spectrum utilization efficiency, reduce interference of other signals with relay control signals and reserve the path necessary to relay information signals more accurately.

A relay apparatus according to a tenth mode of the present invention is the above described first mode, wherein the reception section receives a CDM signal with relay control signals spread using a predetermined spreading code, and the relay section relays an OFDM signal with information signals superimposed on a plurality of subcarriers.

According to this configuration, it is possible to use frequencies of all bands for transmission of information signals, prevent the transmission efficiency of information signals from reducing due to transmission of relay control signals, make the power level of relay control signals by spreading much smaller than the power level of information signals and suppress interference of relay control signals with information signals.

A relay apparatus according to an eleventh mode of the present invention is the above described tenth mode, wherein the reception section receives the CDM signal transmitted simultaneously with the OFDM signal at the same frequency.

According to this configuration, it is possible to effectively use the frequency band, always continue to transmit information signals and further effectively prevent the transmission efficiency of information signals from reducing due to transmission of relay control signals.

A relay apparatus according to a twelfth mode of the present invention is the above described tenth mode, wherein the reception section receives the CDM signal transmitted by being time-division multiplexed with the OFDM signal.

According to this configuration, it is possible to use frequencies of all bands for transmission of information signals, prevent the transmission efficiency of information signals from reducing due to transmission of relay control signals, transmit information signals and relay control signals at different times and further suppress interference of relay control signals with information signals.

A relay apparatus according to a thirteenth mode of the present invention is the above described first mode, wherein the relay section comprises an auto gain control section that controls gains so that transmit power of the information signal is fixed.

According to this configuration, it is possible to prevent abnormal oscillation caused by an echo wave during relay at the same frequency without storing signals in a relay apparatus and prevent the reception level at the relay apparatus from extremely increasing so that the apparatus is not destroyed and stably operate the communication network system.

A relay apparatus according to a fourteenth mode of the present invention is the above described first mode, wherein the relay section comprises an echo canceller that removes echo generated when a signal relayed by the relay apparatus returns to from a signal to be relayed.

According to this configuration, it is possible to reduce influences of the echo signal even when an amount of coupling between transmission/reception antennas of the relay apparatus cannot be reduced sufficiently and arrange the transmission/reception antennas at short distances from one another and thereby reduce the size of the apparatus.

A relay apparatus according to a fifteenth mode of the present invention is the above described fourteenth mode, wherein the echo canceller comprises an FIR filter that inputs a signal relayed by the relay apparatus, a coefficient control section that controls the filter coefficient of the FIR filter and a subtractor that subtracts the output from the FIR filter from the signal to be relayed.

According to this configuration, it is possible to further improve the accuracy of the echo cancellation operation by updating the filter coefficient so that the cancellation error after cancellation of the echo signal converges to 0.

A relay apparatus according to a sixteenth mode of the present invention is the above described fifteenth mode, wherein the coefficient control section comprises an FFT section that fast Fourier transforms signals relayed by the relay apparatus, an error calculation section that compares the result of the fast Fourier transform with an ideal frequency characteristic and calculates an error, an IFFT section that inverse fast Fourier transforms the calculated error and a coefficient updating section that updates the filter coefficient of the FIR filter so that the result of the inverse fast Fourier transform is reduced.

According to this configuration, when an information signal is an OFDM signal, it is possible to implement a relatively small, high accuracy echo canceller by calculating a cancellation error in the frequency domain and causing this cancellation error to converge to 0.

A relay apparatus according to a seventeenth mode of the present invention is the above described sixteenth mode, wherein the coefficient control section further comprises a storage section that stores the transmission source and relay destination of the information signal to be relayed in association with the filter coefficient of the FIR filter during relay of the information signal and the coefficient updating section sets, when the transmission source and relay destination of the information signal to be relayed are the same, the filter coefficient stored in the storage section as an initial value.

According to this configuration, it is possible to shorten the time after the relay operation is started until the cancellation error converges, reduce quality degradation of the signal relayed and realize high accuracy relay.

A relay apparatus according to an eighteenth mode of the present invention is the above described fifteenth mode, wherein the coefficient control section decides the filter coefficient of the FIR filter using a known signal for setting a filter coefficient included in the information signal.

According to this configuration, it is possible to determine a filter coefficient according to the transmission path condition even when the transmission path condition changes drastically and start the relay of the information signal after canceling the echo wave sufficiently.

A relay apparatus according to a nineteenth mode of the present invention is the above described first mode, wherein the reception section receives an RTS signal used for a DCF on a radio local area network as a relay control signal.

A terminal apparatus according to a twentieth mode of the present invention adopts the configuration of the relay apparatus according to any one of the above described modes.

According to this configuration, it is possible to realize operations and effects similar to those of the relay apparatus according to anyone of the above described modes.

A terminal apparatus according to a twenty-first mode of the present invention is a terminal apparatus used in a radio communication system in which information signals transmitted by radio are relayed at the same frequency by a relay apparatus, comprising a generation section that generates a relay control signal including information on the relay time for relaying the information signals and a transmission section that transmits the relay control signal prior to the information signal, wherein the transmission section transmits the information signal during the relay time.

According to this configuration, information signals are transmitted during a relay time notified by relay control signals, it is possible to reserve the transmission path of the information signals during the relay time beforehand and the information signals need not be stored in the relay apparatus. Therefore, when relay is performed at the same frequency on a radio communication network on which bidirectional communication is performed, it is possible to reduce the scale of the relay apparatus and relay signals without temporally switching between transmission and reception and with reduced waste of time.

A terminal apparatus according to a twenty-second mode of the present invention is the above described twenty-first mode, further comprising a reception section that receives a relay control signal indicating whether a relay operation is possible or not during the relay time as a response to the relay control signal transmitted by the transmission section, wherein when the relay control signal received by the reception section indicates that the relay operation is possible, the transmission section transmits the information signal during the relay time.

According to this configuration, the transmitted information signal is relayed/transmitted through a transmission path reserved beforehand, and therefore information signals need not be stored in the relay apparatus. Therefore, it is possible to reduce the scale of the relay apparatus and relay signals without temporally switching between transmission and reception and with reduced waste of time.

A terminal apparatus according to a twenty-third mode of the present invention is the above described twenty-first mode, wherein the transmission section transmits relay control signals assigned a frequency band which is different from that of information signals and narrower than the frequency band assigned to the information signal.

According to this configuration, since a narrower frequency band is assigned to relay control signals having a smaller amount of information than the information signals such as speech and data, it is possible to improve the spectrum utilization efficiency, transmit the information signals and relay control signals in different frequency bands and thereby reduce interference between signals.

A terminal apparatus according to a twenty-fourth mode of the present invention is the above described twenty-first mode, wherein the transmission section transmits an OFDM signal with a relay control signal superimposed on a specific subcarrier out of a plurality of subcarriers and with information signals superimposed on subcarriers other than the specific subcarrier.

According to this configuration, it is not necessary to reserve different frequency bands for relay control signals and information signals, it is possible to improve the spectrum utilization efficiency, remove influences of frequency selective fading through OFDM-based transmission and reserve the path necessary to relay information signals accurately.

A terminal apparatus according to a twenty-fifth mode of the present invention is the above described twenty-fourth mode, wherein the transmission section transmits an OFCDM signal with relay control signals spread using a predetermined spreading code superimposed on the specific subcarrier.

According to this configuration, since relay control signals are spread using the predetermined spreading code, it is possible to improve the spectrum utilization efficiency, reduce interference of other signals with relay control signals and further reserve the path necessary to accurately relay information signals.

A terminal apparatus according to a twenty-sixth mode of the present invention is the above described twenty-first mode, wherein the transmission section transmits a CDM signal obtained by spreading relay control signals using a predetermined spreading code and an OFDM signal with information signals superimposed on a plurality of subcarriers.

According to this configuration, it is possible to use frequencies of all band frequencies for transmission of information signals, prevent the transmission efficiency of information signals from reducing due to transmission of relay control signals, make the power level of relay control signals by spreading much smaller than the power level of information signals and suppress interference of relay control signals with information signals.

A terminal apparatus according to a twenty-seventh mode of the present invention is the above described twenty-sixth mode, wherein the transmission section transmits the OFDM signal and the CDM signal simultaneously at the same frequency.

According to this configuration, it is possible to effectively use frequency bands, always continue to transmit information signals and further effectively prevent the transmission efficiency of information signals due to transmission of relay control signals.

A terminal apparatus according to a twenty-eighth mode of the present invention is the above described twenty-sixth mode, wherein the transmission section transmits the OFDM signal and the CDM signal time-division multiplexed.

According to this configuration, it is possible to use frequencies of all bands for transmission of information signals, prevent the transmission efficiency of information signals from reducing due to transmission of relay control signals, transmit information signals and relay control signals at different times to further suppress interference of relay control signals with information signals.

A terminal apparatus according to a twenty-ninth mode of the present invention is the above described twenty-first mode, wherein the generation section generates an RTS signal used for DCF of a radio local area network.

A relay method according to a thirtieth mode of the present invention is a relay method for a relay apparatus relaying information signals transmitted from a terminal apparatus, comprising a step of the terminal apparatus transmitting a first relay control signal to reserve a path for transmitting the information signals, a step of the relay apparatus receiving the first relay control signal, a step of deciding whether the relay operation of the information signal is possible or not during the relay time notified by the first relay control signal, a step of transmitting a second relay control signal indicating whether the relay operation is possible or not during the relay time as a result of the decision, a step of the terminal apparatus receiving the second relay control signal, a step of transmitting the information signals during the relay time when the second relay control signal indicates that the relay operation is possible and a step of the relay apparatus relaying the information signal during the relay time.

According to this method, when information signals are relayed, the transmission path is reserved up to the relay destination of information signals passing through the relay apparatus beforehand, and therefore the information signals need not be stored in the relay apparatus. Therefore, when relay is performed at the same frequency on a radio communication network on which bidirectional communication is performed, it is possible to reduce the scale of the apparatus and relay signals without temporally switching between transmission and reception and with reduced waste of time.

The present invention is not limited to the above described embodiments, and various variations and modifications may be possible without departing from the scope of the present invention.

This application is based on the Japanese Patent Application No.2003-323674 filed on Sep. 16, 2003 and the Japanese Patent Application No. 2004-228562 filed on Aug. 4, 2004, entire content of which is expressly incorporated by reference herein.

[FIG. 1]
100 TERMINAL APPARATUS
100a TERMINAL APPARATUS
200 RELAY APPARATUS
100b TERMINAL APPARATUS

[FIG. 2]
102 RELAY CONTROL SIGNAL PROCESSING SECTION
1025 COUNTER
1021 TRANSMISSION CONTROL SECTION
104 INFORMATION SIGNAL GENERATION SECTION
1022 TRANSMISSION TIME CALCULATION SECTION
1023 RELAY CONTROL SIGNAL GENERATION SECTION
1024 RELAY CONTROL SIGNAL ANALYSIS SECTION
106 MODULATION SECTION
108 MODULATION SECTION
116 DEMODULATION SECTION
INFORMATION DATA
118 DEMODULATION SECTION
110 RADIO TRANSMISSION SECTION
112 CARRIER SENSING SECTION
114 RADIO RECEPTION SECTION

[FIG. 3]
214 RADIO TRANSMISSION SECTION
202 RADIO RECEPTION SECTION
212 AMPLIFICATION SECTION
210 MODULATION SECTION
204 DEMODULATION SECTION
206 RELAY CONTROL SIGNAL PROCESSING SECTION
2065 RELAY CONTROL SIGNAL GENERATION SECTION
2063 RELAY CONTROL SECTION
2062 RELAY TIME PERCEIVING SECTION
2061 RELAY CONTROL SIGNAL ANALYSIS SECTION
2064 RESERVATION TABLE

Figure 4:
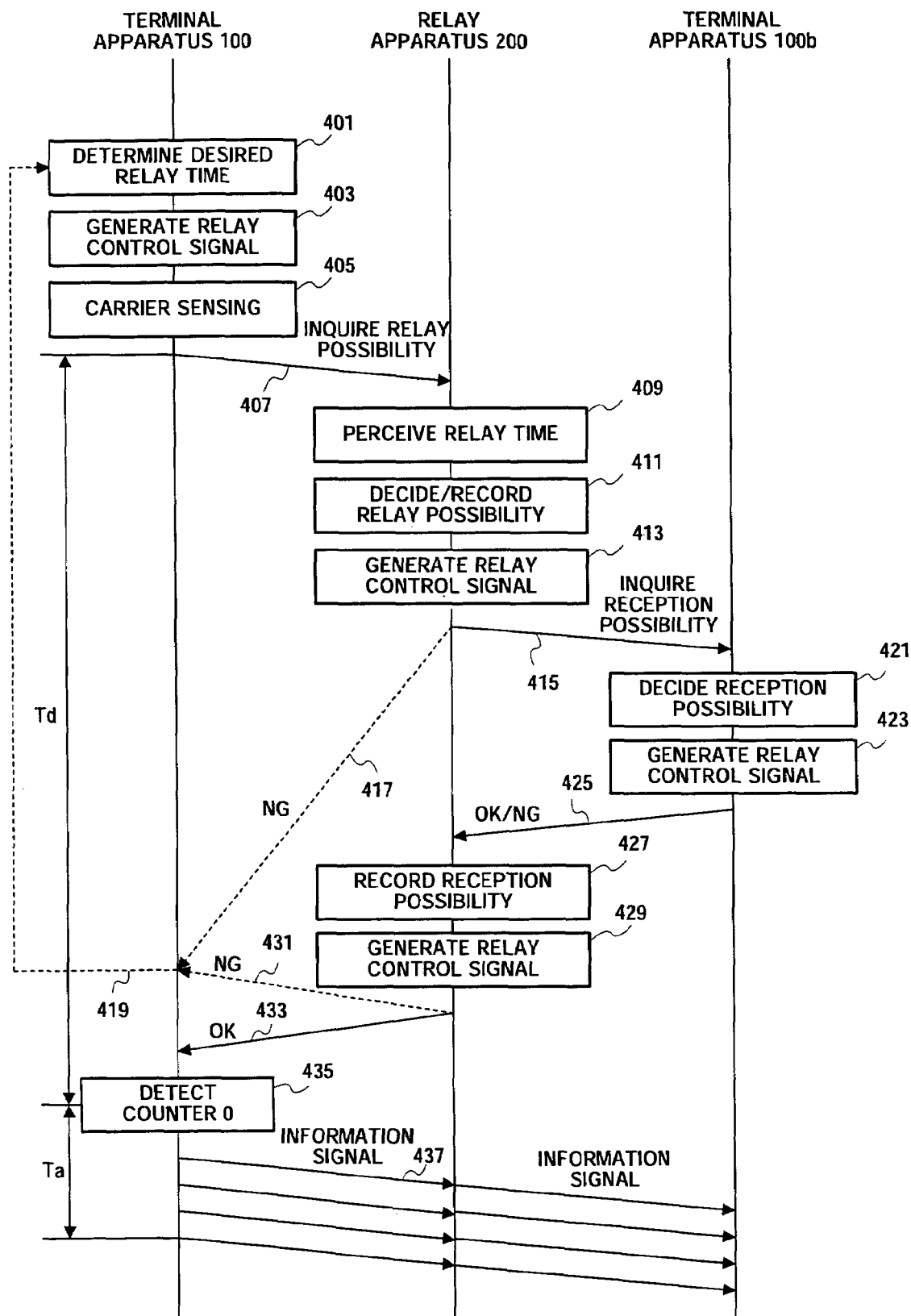
FIG. 4 is a sequence diagram showing a relay operation of the terminal apparatuses and relay apparatus according to Embodiment 1.

[FIG. 4]
100 TERMINAL APPARATUS
200 RELAY APPARATUS
100b TERMINAL APPARATUS
401 DETERMINE DESIRED RELAY TIME
403 GENERATE RELAY CONTROL SIGNAL
405 CARRIER SENSING
407 INQUIRE RELAY POSSIBILITY
409 PERCEIVE RELAY TIME
411 DECIDE/RECORD RELAY POSSIBILITY
413 GENERATE RELAY CONTROL SIGNAL
415 INQUIRE RECEPTION POSSIBILITY
421 DECIDE RECEPTION POSSIBILITY
423 GENERATE RELAY CONTROL SIGNAL
427 RECORD RECEPTION POSSIBILITY
429 GENERATE RELAY CONTROL SIGNAL
435 DETECT COUNTER 0
437 INFORMATION SIGNAL
INFORMATION SIGNAL

[FIG. 5]
501 DESTINATION ADDRESS
503 TRANSMISSION SOURCE ADDRESS
505 SIGNAL TYPE
509 START TIME
511 CONTINUATION TIME

[FIG. 6]
POWER LEVEL
INFORMATION SIGNAL
RELAY CONTROL SIGNAL
FREQUENCY

Figure 7:
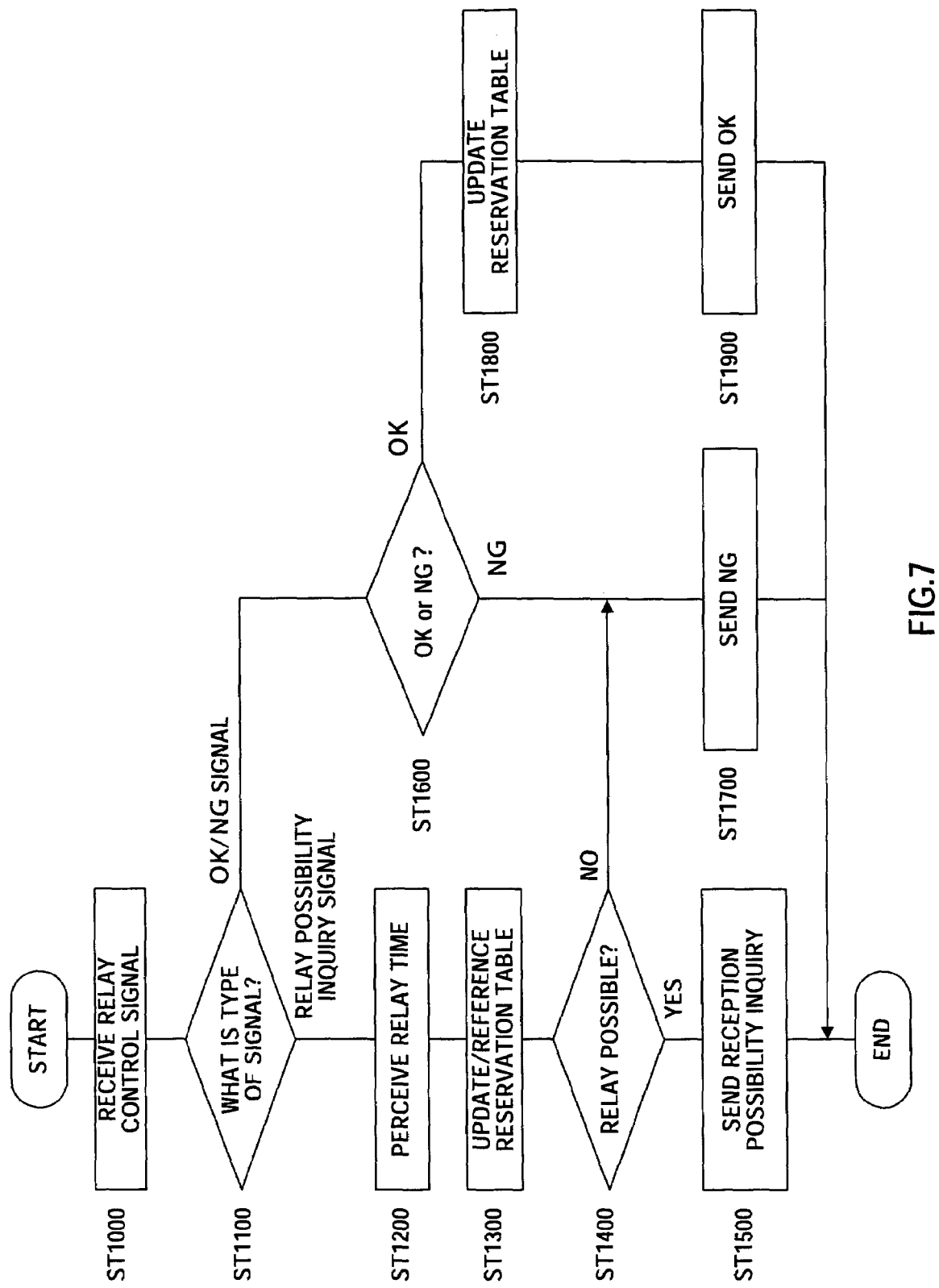
FIG. 7 is a flow chart showing an operation of the relay apparatus according to Embodiment 1.

[FIG. 7]
START
ST1000 RECEIVE RELAY CONTROL SIGNAL
ST1100 WHAT IS TYPE OF SIGNAL?
OK/NG SIGNAL
RELAY POSSIBILITY INQUIRY SIGNAL
ST1200 PERCEIVE RELAY TIME
ST1300 UPDATE/REFERENCE RESERVATION TABLE
ST1400 RELAY POSSIBLE?
ST1500 SEND RECEPTION POSSIBILITY INQUIRY
ST1700 SEND NG
ST1800 UPDATE RESERVATION TABLE
ST1900 SEND OK

[FIG. 8]
801 DESTINATION ADDRESS
TERMINAL B ADDRESS
TERMINAL C ADDRESS
803 TRANSMISSION SOURCE ADDRESS
TERMINAL A ADDRESS
TERMINAL D ADDRESS
805 START TIME
807 CONTINUATION TIME
809 RELAY DECISION
811 RECEPTION DECISION BY DESTINATION TERMINAL

[FIG. 9]
102a RELAY CONTROL SIGNAL PROCESSING SECTION
1025 COUNTER
2064 RESERVATION TABLE
1021a TRANSMISSION CONTROL SECTION
2063a RELAY CONTROL SECTION
2062 RELAY TIME PERCEIVING SECTION
104 INFORMATION SIGNAL GENERATION SECTION
1022 TRANSMISSION TIME CALCULATION SECTION
1023 RELAY CONTROL SIGNAL GENERATION SECTION
1024 RELAY CONTROL SIGNAL ANALYSIS SECTION
106 MODULATION SECTION
108 MODULATION SECTION
112 CARRIER SENSING SECTION
116 DEMODULATION SECTION
INFORMATION DATA
118 DEMODULATION SECTION
110 RADIO TRANSMISSION SECTION
212 AMPLIFICATION SECTION
114 RADIO RECEPTION SECTION

[FIG. 10]
104 INFORMATION SIGNAL GENERATION SECTION
102 RELAY CONTROL SIGNAL PROCESSING SECTION
INFORMATION DATA
106 MODULATION SECTION
108 MODULATION SECTION
116 DEMODULATION SECTION
118 DEMODULATION SECTION
302 S/P CONVERSION SECTION
304 S/P CONVERSION SECTION

322 P/S CONVERSION SECTION
324 P/S CONVERSION SECTION
306 MULTIPLEXING SECTION
320 SEPARATION SECTION
308 IFFT SECTION
318 FFT SECTION
310 P/S CONVERSION SECTION
316 S/P CONVERSION SECTION
312 GI ADDITION SECTION
314 GI REMOVAL SECTION
110 RADIO TRANSMISSION SECTION
112 CARRIER SENSING SECTION
114 RADIO RECEPTION SECTION

[FIG. 11]
214 RADIO TRANSMISSION SECTION
202 RADIO RECEPTION SECTION
212 AMPLIFICATION SECTION
422 TIMING ADJUSTMENT SECTION
420 GI ADDITION SECTION
402 GI REMOVAL SECTION
418 P/S CONVERSION SECTION
404 S/P CONVERSION SECTION
416 IFFT SECTION
406 FFT SECTION
0 SIGNAL
414 MULTIPLEXING SECTION
408 SEPARATION SECTION
412 S/P CONVERSION SECTION
410 P/S CONVERSION SECTION
210 MODULATION SECTION
206 RELAY CONTROL SIGNAL PROCESSING SECTION
204 DEMODULATION SECTION

[FIG. 12]
POWER LEVEL
RELAY CONTROL SIGNAL
INFORMATION SIGNAL
FREQUENCY

[FIG. 13]
104 INFORMATION SIGNAL GENERATION SECTION
108 MODULATION SECTION
102 RELAY CONTROL SIGNAL PROCESSING SECTION
116 DEMODULATION SECTION
INFORMATION DATA
106 MODULATION SECTION
502 SPREADING SECTION
504 DESPREADING SECTION
118 DEMODULATION SECTION
302 S/P CONVERSION SECTION
304 S/P CONVERSION SECTION
322 P/S CONVERSION SECTION
324 P/S CONVERSION SECTION
306 MULTIPLEXING SECTION
320 SEPARATION SECTION
308 IFFT SECTION
318 FFT SECTION
310 P/S CONVERSION SECTION
316 S/P CONVERSION SECTION
312 GI ADDITION SECTION
314 GI REMOVAL SECTION
110 RADIO TRANSMISSION SECTION
112 CARRIER SENSING SECTION
114 RADIO RECEPTION SECTION

[FIG.14]
214 RADIO TRANSMISSION SECTION
202 RADIO RECEPTION SECTION
212 AMPLIFICATION SECTION
422 TIMING ADJUSTMENT SECTION
420 GI ADDITION SECTION
402 GI REMOVAL SECTION
418 P/S CONVERSION SECTION
404 S/P CONVERSION SECTION
416 IFFT SECTION
406 FFT SECTION
0 SIGNAL
414 MULTIPLEXING SECTION
408 SEPARATION SECTION
412 S/P CONVERSION SECTION
410 P/S CONVERSION SECTION
604 SPREADING SECTION
210 MODULATION SECTION
206 RELAY CONTROL SIGNAL PROCESSING SECTION
204 DEMODULATION SECTION
602 DESPREADING SECTION

[FIG. 15]
104 INFORMATION SIGNAL GENERATION SECTION
102 RELAY CONTROL SIGNAL PROCESSING SECTION
INFORMATION DATA
106 MODULATION SECTION
108 MODULATION SECTION
116 DEMODULATION SECTION
118 DEMODULATION SECTION
302 S/P CONVERSION SECTION
502 SPREADING SECTION
504 DESPREADING SECTION
324 P/S CONVERSION SECTION
308 IFFT SECTION
318 FFT SECTION
310 P/S CONVERSION SECTION
316 S/P CONVERSION SECTION
312 GI ADDITION SECTION
314 GI REMOVAL SECTION
110 RADIO TRANSMISSION SECTION
112 CARRIER SENSING SECTION
114 RADIO RECEPTION SECTION

[FIG. 16]
214 RADIO TRANSMISSION SECTION
202 RADIO RECEPTION SECTION
212 AMPLIFICATION SECTION
604 SPREADING SECTION
602 DESPREADING SECTION
210 MODULATION SECTION
206 RELAY CONTROL SIGNAL PROCESSING SECTION
204 DEMODULATION SECTION

[FIG. 17]
POWER LEVEL
INFORMATION SIGNAL
RELAY CONTROL SIGNAL
FREQUENCY

[FIG. 18]
104 INFORMATION SIGNAL GENERATION SECTION
102 RELAY CONTROL SIGNAL PROCESSING SECTION
INFORMATION DATA
106 MODULATION SECTION
302 S/P CONVERSION SECTION

308 IFFT SECTION
310 P/S CONVERSION SECTION
108 MODULATION SECTION
502 SPREADING SECTION
116 DEMODULATION SECTION
504 DESPREADING SECTION
118 DEMODULATION SECTION
324 P/S CONVERSION SECTION
318 FFT SECTION
316 S/P CONVERSION SECTION
312 GI ADDITION SECTION
314 GI REMOVAL SECTION
110 RADIO TRANSMISSION SECTION
112 CARRIER SENSING SECTION
114 RADIO RECEPTION SECTION

[FIG. 19]
214 RADIO TRANSMISSION SECTION
202 RADIO RECEPTION SECTION
212 AMPLIFICATION SECTION
422 TIMING ADJUSTMENT SECTION
604 SPREADING SECTION
602 DESPREADING SECTION
210 MODULATION SECTION
206 RELAY CONTROL SIGNAL PROCESSING SECTION
204 DEMODULATION SECTION

[FIG. 20]
214 RADIO TRANSMISSION SECTION
202 RADIO RECEPTION SECTION
902 AUTO GAIN CONTROL SECTION
210 MODULATION SECTION
204 DEMODULATION SECTION
206 RELAY CONTROL SIGNAL PROCESSING SECTION
2065 RELAY CONTROL SIGNAL GENERATION SECTION
2063 RELAY CONTROL SECTION
2062 RELAY TIME PERCEIVING SECTION
2061 RELAY CONTROL SIGNAL ANALYSIS SECTION
2064 RESERVATION TABLE

[FIG. 21]
214 RADIO TRANSMISSION SECTION
202 RADIO RECEPTION SECTION
902 AUTO GAIN CONTROL SECTION
904 ECHO CANCELER
210 MODULATION SECTION
204 DEMODULATION SECTION
206 RELAY CONTROL SIGNAL PROCESSING SECTION
2065 RELAY CONTROL SIGNAL GENERATION SECTION
2063 RELAY CONTROL SECTION
2062 RELAY TIME PERCEIVING SECTION
2061 RELAY CONTROL SIGNAL ANALYSIS SECTION
2064 RESERVATION TABLE

[FIG. 22]
FROM SWITCH 208
904 ECHO CANCELER
9042 COEFFICIENT CONTROL SECTION
TO AUTO GAIN CONTROL SECTION 902

[FIG. 23]
FROM SWITCH 208
904 ECHO CANCELER
9042 COEFFICIENT CONTROL SECTION
TO AUTO GAIN CONTROL SECTION 902

[FIG. 24]
904 ECHO CANCELER
FROM SWITCH 208
9042 COEFFICIENT CONTROL SECTION
9042d COEFFICIENT UPDATING SECTION
9042c IFFT SECTION
9042b ERROR CALCULATION SECTION
9042a FFT SECTION
TO AUTO GAIN CONTROL SECTION 902

[FIG. 25]
904 ECHO CANCELER
FROM SWITCH 208
9042 COEFFICIENT CONTROL SECTION
9042e STORAGE SECTION
FROM RELAY CONTROL SECTION 2063
9042d COEFFICIENT UPDATING SECTION
9042c IFFT SECTION
9042b ERROR CALCULATION SECTION
9042a FFT SECTION
TO AUTO GAIN CONTROL SECTION 902

[FIG.26]
904 ECHO CANCELER
FROM SWITCH 208
9042 COEFFICIENT CONTROL SECTION
9045 KNOWN SIGNAL STORAGE SECTION
TO AUTO GAIN CONTROL SECTION 902

[FIG. 27]
214 RADIO TRANSMISSION SECTION
202 RADIO RECEPTION SECTION
212 AMPLIFICATION SECTION
904 ECHO CANCELER
210 MODULATION SECTION
906 GAIN CONTROL SECTION
204 DEMODULATION SECTION
206 RELAY CONTROL SIGNAL PROCESSING SECTION
2065 RELAY CONTROL SIGNAL GENERATION SECTION
2063 RELAY CONTROL SECTION
2062 RELAY TIME PERCEIVING SECTION
2061 RELAY CONTROL SIGNAL ANALYSIS SECTION
2064 RESERVATION TABLE

[FIG. 28]
C INFORMATION CONCENTRATION CENTER
WIRED NETWORK
AP-1 ACCESS POINT
AP-2 ACCESS POINT
200-3 RELAY APPARATUS
100-1 TERMINAL APPARATUS
100a-1 TV CAMERA
200-1 RELAY APPARATUS
200-2 RELAY APPARATUS
100-2 TERMINAL APPARATUS
100a-2 TV CAMERA
100-3 TERMINAL APPARATUS
100a-3 TV CAMERA

What is claimed is:

1. A relay apparatus for relaying information signals transmitted by radio at the same frequency, comprising:
a reception section that receives a relay control signal which notifies a relay time which includes a start time at which the relay of said information signals starts and a continuation time during which relay continues for relaying said information signals before transmitting said information signals; and a relay section that relays said information signals during the relay time notified by said relay control signal.

2. The relay apparatus according to claim 1, further comprising a decision section that decides whether a relay operation on an information signal is possible or not within the relay time notified by said relay control signal,
wherein, when said decision result by said decision section shows that the relay operation is possible, said relay section relays the information signal during said relay time.

3. The relay apparatus according to claim 2, wherein said reception section receives a relay possibility inquiry signal for inquiring whether relay of an information signal is possible or not as a relay control signal,
said decision section decides, when relay of information signals other than said information signal during a relay time notified by said relay possibility inquiry signal is not scheduled and the relay destination of said information signal is not scheduled to receive any information signal other than said information signal, that the relay operation of said information signal is possible during said relay time.

4. The relay apparatus according to claim 3, wherein said decision section includes a reservation table that stores the relay time notified by said relay possibility inquiry signal in association with the possibility of relay operation during said relay time and decides whether other information signals are scheduled to be relayed or not during a newly notified relay time with reference to said reservation table.

5. The relay apparatus according to claim 3, wherein said decision section decides whether the other information signal is scheduled to be received or not according to a relay control signal indicating the possibility of reception transmitted from the relay destination of said information signal.

6. The relay apparatus according to claim 1, wherein said reception section receives a relay control signal assigned a frequency band which is different from that of said information signals and is a frequency band narrower than the frequency band assigned to said information signals.

7. The relay apparatus according to claim 1, wherein the reception section receives an RTS signal used for a DCF on a radio local area network as a relay control signal.

8. A terminal apparatus comprising the relay apparatus according to any one of claims 1 to 6 and 7.

9. A terminal apparatus used in a radio communication system in which information signals transmitted by radio are relayed at the same frequency by a relay apparatus, comprising:

a generation section that generates a relay control signal including information on the relay time which includes a start time at which the relay of said information signals starts and a continuation time during which relay continues for relaying said information signals; and
a transmission section that transmits said relay control signal prior to said information signals,
wherein said transmission section transmits said information signals during said relay time.

10. The terminal apparatus according to claim 9, further comprising a reception section that receives a relay control signal indicating whether a relay operation is possible or not during said relay time as a response to the relay control signal transmitted by said transmission section,
wherein, when the relay control signal received by said reception section indicates that the relay operation is possible, said transmission section transmits said information signals during said relay time.

11. The terminal apparatus according to claim 9, wherein said transmission section transmits relay control signals assigned a frequency band which is different from that of information signals and narrower than the frequency band assigned to said information signal.

12. The terminal apparatus according to claim 9, wherein said generation section generates an RTS signal used for DCF of a radio local area network.

13. A relay method for a relay apparatus relaying information signals transmitted from a terminal apparatus, comprising:
a step of said terminal apparatus transmitting a first relay control signal to reserve a path for transmitting said information signals;
a step of said relay apparatus receiving said first relay control signal;
a step of deciding whether the relay operation of said information signals is possible or not during a relay time notified by said first relay control signal;
a step of transmitting a second relay control signal indicating whether the relay operation is possible or not during said relay time as a result of the decision;
a step of said terminal apparatus receiving said second relay control signal;
a step of transmitting said information signals during said relay time when said second relay control signal indicates that the relay operation is possible; and
a step of said relay apparatus relaying said information signals during said relay time.

* * * * *